US010487474B2

(12) United States Patent
Marvin et al.

(10) Patent No.: US 10,487,474 B2
(45) Date of Patent: Nov. 26, 2019

(54) SYSTEM AND METHOD FOR HYDRAULIC ACTUATOR LOCK VALVE

(71) Applicant: Deere & Company, Moline, IL (US)

(72) Inventors: Paul D. Marvin, DeWitt, IA (US); Jeffrey R. Hochstatter, Wyanet, IL (US)

(73) Assignee: DEERE & COMPANY, Moline, IL (US)

( * ) Notice: Subject to any disclaimer, the term of this patent is extended or adjusted under 35 U.S.C. 154(b) by 124 days.

(21) Appl. No.: 15/632,240

(22) Filed: Jun. 23, 2017

(65) Prior Publication Data

US 2018/0371719 A1    Dec. 27, 2018

(51) Int. Cl.
| | |
|---|---|
| *E02F 3/84* | (2006.01) |
| *F15B 13/01* | (2006.01) |
| *F16K 31/122* | (2006.01) |
| *F16K 37/00* | (2006.01) |
| *A01D 41/14* | (2006.01) |

(Continued)

(52) U.S. Cl.
CPC ............ *E02F 3/844* (2013.01); *A01D 41/145* (2013.01); *F15B 13/01* (2013.01); *F16K 31/1221* (2013.01); *F16K 37/0008* (2013.01); *F15B 11/003* (2013.01); *F15B 11/16* (2013.01); *F15B 13/015* (2013.01); *F15B 2211/30515* (2013.01);

(Continued)

(58) Field of Classification Search
CPC ..... F15B 13/01; F15B 13/015; F16K 31/1221
See application file for complete search history.

(56) References Cited

U.S. PATENT DOCUMENTS

| | | | |
|---|---|---|---|
| 2,914,083 A | 11/1959 | Cronkhite | |
| 3,604,186 A | 9/1971 | Coleman | |

(Continued)

FOREIGN PATENT DOCUMENTS

| | | |
|---|---|---|
| AU | 2011202521 A1 | 12/2011 |
| CN | 103994265 A | 8/2014 |

(Continued)

OTHER PUBLICATIONS

Rotork, Pad Operated (Push-Pull) with Position Indicator Switch, http://www.rotork.com/en/product/index/padoperatedpushpullwithpositionindicatorswitch, Prior Art.

(Continued)

*Primary Examiner* — F Daniel Lopez
*Assistant Examiner* — Matthew Wiblin
(74) *Attorney, Agent, or Firm* — Klintworth & Rozenblat IP LLP

(57) ABSTRACT

System and method for a lock valve for a hydraulic actuator. The lock valve includes a valve housing coupled to the hydraulic actuator. The valve housing defines a chamber in selective fluid communication with a hydraulic circuit. The lock valve includes a valve body received within the chamber and responsive to the hydraulic circuit to move to an unlock position in which the lock valve is unlocked. The valve body includes a rod having a first end and an opposite second end. The valve body includes a head coupled to the rod between the first end and the second end. The head is responsive to the hydraulic circuit to move the valve body to the unlock position, and in the unlock position, the first end of the rod extends outwardly from the valve housing to visually indicate the lock valve is unlocked.

18 Claims, 17 Drawing Sheets

(51) Int. Cl.
*F15B 11/16* (2006.01)
*F15B 11/00* (2006.01)
(52) U.S. Cl.
CPC . *F15B 2211/6303* (2013.01); *F15B 2211/665* (2013.01)

(56) References Cited

U.S. PATENT DOCUMENTS

| | | | | |
|---|---|---|---|---|
| 4,103,864 | A | * | 8/1978 | Hagendorn ......... F16K 31/1221 251/25 |
| 4,283,996 | A | | 8/1981 | Jackson et al. |
| 4,356,760 | A | | 11/1982 | Bouteille |
| 4,541,229 | A | * | 9/1985 | Elijah ................. A01D 41/141 56/10.2 E |
| 4,582,082 | A | * | 4/1986 | Tosseghini .......... F16K 31/1221 137/270 |
| 4,706,710 | A | | 11/1987 | Meyer et al. |
| 4,819,691 | A | | 4/1989 | Löfgren et al. |
| 4,995,421 | A | | 2/1991 | Bonacorsi et al. |
| 5,813,310 | A | * | 9/1998 | Hori ..................... E02F 9/2221 137/596.2 |
| 6,941,737 | B2 | * | 9/2005 | Kempf .................. A01D 75/20 56/10.2 R |
| 2003/0169176 | A1 | | 9/2003 | Schafer et al. |
| 2007/0187634 | A1 | * | 8/2007 | Sneh ......................... F16K 7/14 251/30.01 |
| 2010/0059125 | A1 | * | 3/2010 | Kot ......................... F15B 13/01 137/485 |
| 2010/0163765 | A1 | | 7/2010 | Gregoire |
| 2016/0249530 | A1 | | 9/2016 | Brockmann |
| 2016/0298788 | A1 | * | 10/2016 | Messerschmidt ... F16K 31/1221 |

FOREIGN PATENT DOCUMENTS

| | | |
|---|---|---|
| DE | 4234742 A1 | 4/1994 |
| DE | 102013014673 A1 | 3/2015 |
| DE | 102015202178 A1 | 8/2016 |
| EP | 1872645 A1 | 2/2008 |
| EP | 2778435 A1 | 9/2014 |
| WO | 2016056280 A1 | 4/2016 |

OTHER PUBLICATIONS

Extended European Search Report for application No. 18177000 dated May 14, 2019.

* cited by examiner

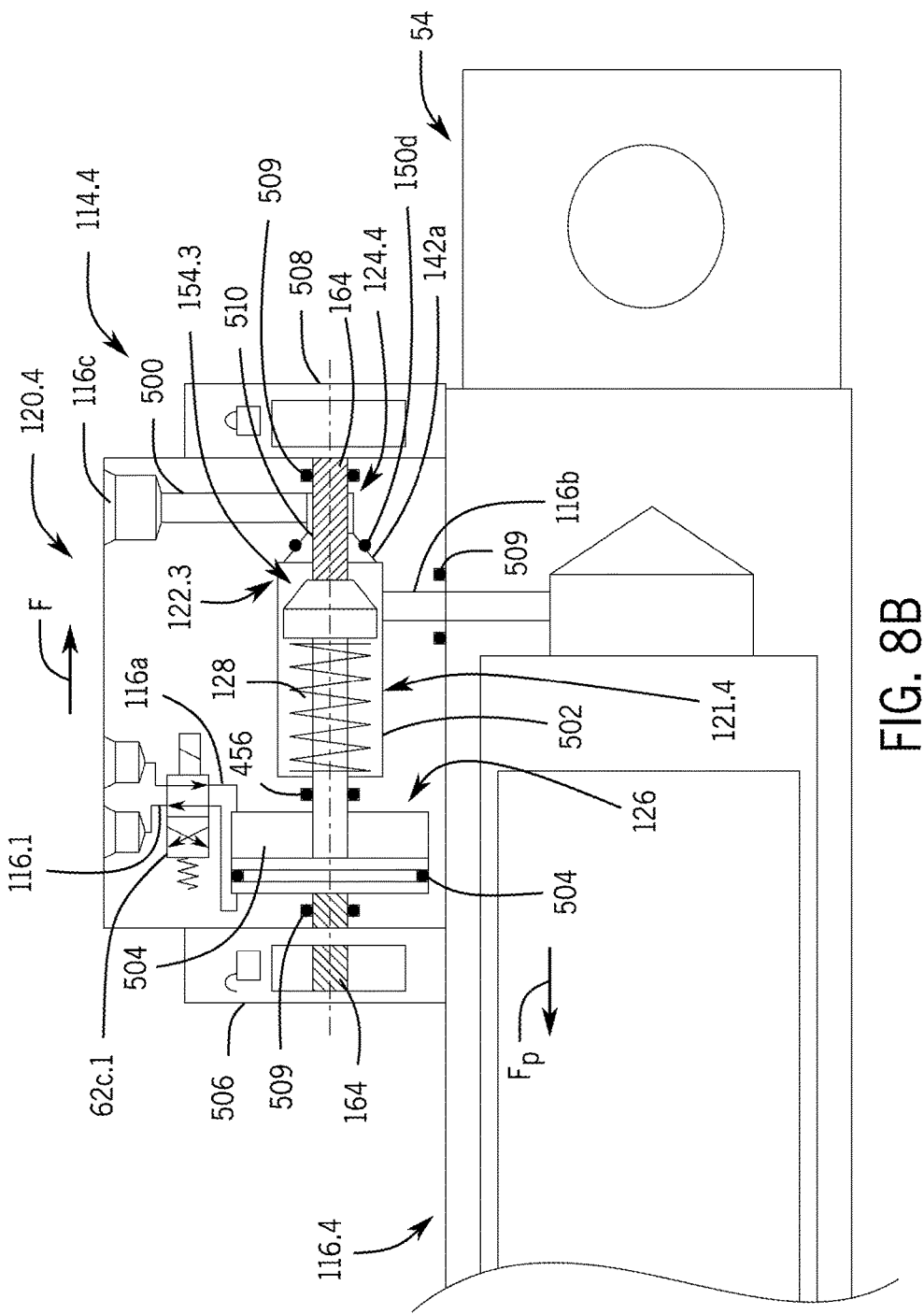

SYSTEM AND METHOD FOR HYDRAULIC ACTUATOR LOCK VALVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a hydraulic actuator lock valve, and for an agricultural work vehicle having a header movable by a hydraulic actuator based on a position of a lock valve.

BACKGROUND OF THE DISCLOSURE

Generally, an agricultural work vehicle has a header and a feederhouse coupled to the header, which is adjustable by a hydraulic actuator to harvest particular crops. In certain instances, it may be desirable to work under or around the header or feederhouse, for repairs, maintenance, etc. Typically, in order to perform work under the header or feederhouse, the header or feederhouse is raised upward to a fully raised position and a mechanical support is positioned around the hydraulic actuator to maintain the header or feederhouse in the fully raised position above the ground surface. As the mechanical support has a fixed length, the header or feederhouse may be secured in a single position, which may be undesirable given the nature of the work to be performed under or around the header or feederhouse.

SUMMARY OF THE DISCLOSURE

The disclosure provides a system and method for a hydraulic actuator lock valve, which may be actuated to lock the header or feederhouse in a plurality of positions over a range of motion of the header or feederhouse relative to the ground surface.

In one aspect the disclosure provides a lock valve for a hydraulic actuator. The lock valve includes a valve housing coupled to the hydraulic actuator. The valve housing defines a chamber in selective fluid communication with a hydraulic circuit. The lock valve includes a valve body received within the chamber and responsive to the hydraulic circuit to move to an unlock position in which the lock valve is unlocked. The valve body includes a rod having a first end and an opposite second end. The valve body includes a head coupled to the rod between the first end and the second end. The head is responsive to the hydraulic circuit to move the valve body to the unlock position, and in the unlock position, the first end of the rod extends outwardly from the valve housing to visually indicate the lock valve is unlocked.

In another aspect the disclosure provides an agricultural work vehicle having a header movable by actuation of a hydraulic actuator over a range of motion relative to a ground surface. The agricultural work vehicle includes a lock valve coupled to the hydraulic actuator. The lock valve including a valve housing coupled to the hydraulic actuator that defines a chamber in selective fluid communication with a hydraulic circuit and a valve body received within the chamber. The valve body is responsive to the hydraulic circuit to move to an unlock position in which the lock valve is unlocked. The valve body includes a rod having a first end and an opposite second end. The valve body includes a head coupled to the rod between the first end and the second end. The head is responsive to the hydraulic circuit to move the valve body to the unlock position. The agricultural work vehicle includes a controller that commands the hydraulic circuit to supply hydraulic fluid to the chamber to move the valve body to the unlock position based on one or more inputs. In the lock position, the lock valve is configured to lock the hydraulic actuator in a plurality of positions over the range of motion.

The details of one or more embodiments are set forth in the accompanying drawings and the description below. Other features and advantages will become apparent from the description, the drawings, and the claims.

BRIEF DESCRIPTION OF THE DRAWINGS

FIG. 8B is a schematic view of the lock valve of FIG. 8A, which illustrates the lock valve in the unlock position;

Like reference symbols in the various drawings indicate like elements.

DETAILED DESCRIPTION

Figure 1:
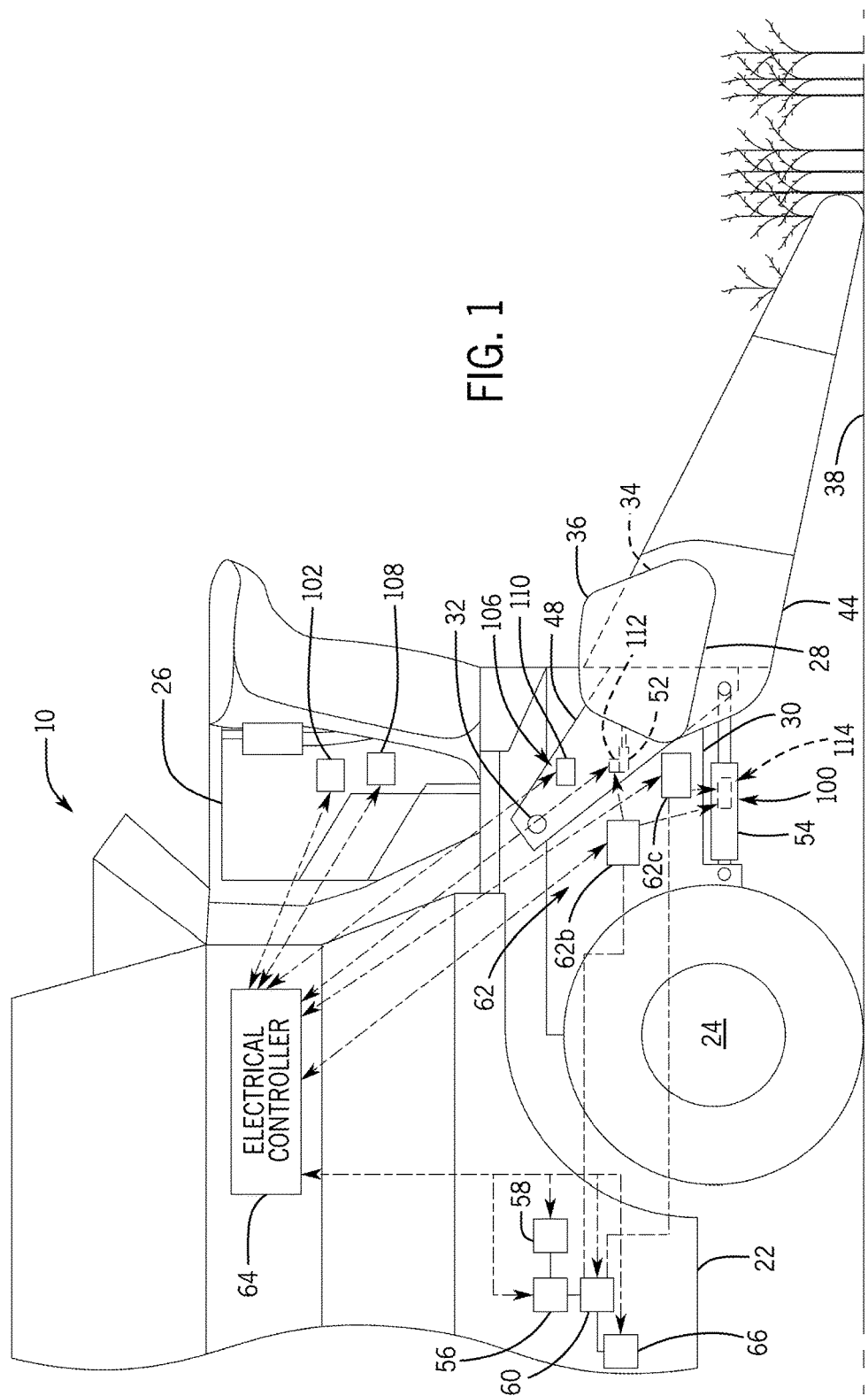
FIG. 1 is a side view of an example work vehicle in the form of an agricultural combine in which the disclosed hydraulic actuator lock valve system and method may be used.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for a hydraulic actuator lock valve, as shown in the accompanying figures of the drawings described briefly above. Generally, the disclosed systems (and work vehicles, such as agricultural work vehicles, in which they are implemented) enable an operator to lock a hydraulic actuator associated with an end effector of the agricultural work vehicle in various positions relative to a ground surface. Stated another way, the end effector has a range of motion defined by the hydraulic actuator relative to a ground surface, and the lock valve is capable of locking the hydraulic actuator in a plurality of positions over the range of motion of the end effector. Moreover, the hydraulic actuator lock valve provides a visual indicator to individuals near the agricultural work vehicle that the hydraulic actuator lock valve is in a lock position or a unlock position. This enables individuals in proximity to the end effector to easily determine whether the position of the header and/or feederhouse is fixed.

In one example, the lock valve includes a valve housing that is removably received within a housing of the hydraulic actuator. By removably receiving the valve housing within the housing of the hydraulic actuator, the lock valve may be removed for repairs, maintenance, etc. The lock valve includes a valve body received within the valve housing that is responsive to hydraulic fluid received from a hydraulic circuit to move to an unlock position. In the unlock position, a portion of the valve body extends beyond the valve housing to visually indicate that the valve is in the unlock position. Upon the removal of the hydraulic fluid, a biasing member moves the lock valve into the lock position, thereby inhibiting the movement of the hydraulic actuator. Thus, the hydraulic actuator may be locked at a selected position or height relative to the ground using the lock valve. As used herein, the hydraulic circuit of the agricultural work vehicle, such as a combine, may include one or more hydraulic pumps, one or more control valves, including a pilot control valve, and combinations thereof that supply hydraulic fluid to the lock valve.

As noted above, the disclosed hydraulic actuator lock valve system may be utilized with regard to various machines or work vehicles with end effectors, including tractors and other work vehicles. Referring to FIG. 1, in some embodiments, a hydraulic actuator lock valve system 100 may be used with a work vehicle, such as a combine 10.

With continued reference to FIG. 1, a chassis 22 of the combine 10 is supported by wheels 24 or tracks (not shown). A cab 26 is supported by the chassis 22 and includes a human-machine interface, an operator seat, etc. for an operator of the combine 10. A feederhouse 28 is attached to a main body 30 of the combine 10 at a pivot mount 32. An inlet opening 34 is disposed at a forward (i.e., to the left in FIG. 1) end 36 of the feederhouse 28.

Different configurations of the wheels 24 (or tracks) may be possible, such that the chassis 22 is supported at different heights with respect to the ground 38. Accordingly, for different configurations of the wheels 24, the pivot mount 32 and the feederhouse 28 may be oriented at different heights from the ground 38. This may result in the forward end 36 of the feederhouse 28 being disposed at different angles, with respect to the ground 38, when the feederhouse 28 is pivoted to dispose the forward end 36 at a particular height from the ground 38.

A header 44 is attached for operation at a forward end 36 of the feederhouse 28. The header 44 collects crop as the combine 10 moves along the ground 38. The header 44 may include a reciprocating cutter bar, which cuts the crop on the ground 38.

Optionally, one or more tilt hydraulic actuators or cylinders 52 are mounted to the feederhouse 28 and to the header 44, such that the tilt hydraulic cylinders 52 may be driven or actuated in order to pivot the header 44 about the feederhouse 28. If included, the combine 10 may have two tilt hydraulic cylinders 52, one on a left side of the feederhouse 28 and one on a right side of the feederhouse 28 in a forward driving direction of the combine 10. It should be noted, however, that the combine 10 may have any number of tilt hydraulic cylinders 52, such as one, three, etc. Each of the tilt hydraulic cylinders 52 includes an end mounted to the feederhouse 28 at a pin, for example, and an end mounted to the header 44 at a pin, for example. As will be discussed, upon activation of the tilt hydraulic cylinders 52, the header 44 may be moved or pivoted to account for different crops and/or wheels 24.

One or more lift hydraulic actuators or cylinders 54 are mounted to the feederhouse 28 and to the chassis 22, such that the lift hydraulic cylinders 54 may be driven or actuated in order to pivot the feederhouse 28 about the pivot mount 32. Generally, the combine 10 includes two lift hydraulic cylinders 54, one on a left side of the feederhouse 28 and one on a right side of the feederhouse 28 in a forward driving direction of the combine 10. It should be noted, however, that the combine 10 may have any number of lift hydraulic cylinders 54, such as one, three, etc. Each of the lift hydraulic cylinders 54 includes an end mounted to the feederhouse 28 at a pin, for example, and an end mounted to the chassis 22 at a pin, for example. As will be discussed, upon activation of the lift hydraulic cylinders 54, the feederhouse 28, and thus, the header 44, may be moved or pivoted over a range of motion to dispose the forward end 36 at a particular position or height from the ground 38.

Thus, in the embodiment depicted, the feederhouse 28, and thus, the header 44 is pivotable about the pivot mount 32 by the one or more lift hydraulic cylinders 54. In other configurations, other movements of the header 44 and/or feederhouse 28 may be possible. Further, in some embodiments, a different number or configuration of hydraulic cylinders or other actuators may be used. Generally, the hydraulic actuator lock valve system 100 disclosed herein may be applied with respect to any type of actuator capable of producing relative movement of a header 44 and/or feederhouse 28 relative to the chassis 22.

The combine 10 includes a source of propulsion, such as an engine 56. The engine 56 supplies power to a transmission 58. The transmission 58 transfers the power from the engine 56 to a suitable driveline coupled to one or more wheels 24 of the combine 10 to enable the combine 10 to move. In one example, the engine 56 is an internal combustion engine, such as a diesel engine. It should be noted that the use of an internal combustion engine is merely exemplary, as the propulsion device can be a fuel cell, electric motor, a hybrid-electric motor, etc.

The combine 10 also includes one or more pumps 60, which may be driven by the engine 56 of the combine 10. Flow from the pumps 60 may be routed through various control valves 62 and various conduits (e.g., flexible hoses and lines) to control various components associated with the combine 10. Flow from the pumps 60 may be routed through various control valves 62 and various conduits (e.g., flexible hoses) in order to drive the hydraulic cylinders 52, 54. Flow from the pumps 60 may also power various other components of the combine 10. The flow from the pumps 60 may be controlled in various ways (e.g., through control of the various control valves 62), in order to cause movement of the tilt hydraulic cylinders 52, and thus, the header 44 relative to the feederhouse 28. In this way, for example, a movement of the header 44 relative to the feederhouse 28 may be implemented by various control signals to the pumps 60, control valves 62, and so on. The flow from the pumps 60 may also be controlled in various ways (e.g., through control of the various control valves 62), in order to cause movement of the lift hydraulic cylinders 54, and thus, the feederhouse 28 and the header 44 relative to the chassis 22. In this way, for example, a movement of the header 44 and the feederhouse 28 relative to the chassis 22 may be implemented by various control signals to the pumps 60, control valves 62, and so on.

In one example, the control valves 62 include a lift control valve 62b in fluid communication with the pumps 60 and in communication with a controller 64. The lift control valve 62b is responsive to one or more control signals from the controller 64 to cause movement of the lift hydraulic cylinders 54, and thus, the header 44 and the feederhouse 28 relative to the chassis 22. The lift control valve 62b is responsive to one or more control signals from the controller 64 to cause movement of the tilt hydraulic cylinders 52, and thus, the header 44 relative to the feederhouse 28.

In various embodiments, the combine 10 includes a pilot control valve 62c. The pilot control valve 62c is in fluid communication with the pumps 60 and in communication with the controller 64. The pilot control valve 62c is responsive to one or more control signals from the controller 64 to cause movement of one or more lift lock valves 114 of the lock valves 106 (FIG. 2A), and thus, enable or disable the movement of header 44 and the feederhouse 28 relative to the chassis 22. In one example, the pilot control valve 62c is a solenoid actuated spring return two position three way directional control valve.

Generally, the controller 64 (or multiple controllers) may be provided, for control of various aspects of the operation of the combine 10, in general. The controller 64 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 64 may be configured to execute various computational and control functionality with respect to the combine 10 (or other machinery). In some embodiments, the controller 64 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 64 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 64 may be in electronic, hydraulic, mechanical, or other communication with various other systems or devices of the combine 10 (or other machinery). For example, the controller 64 may be in electronic or hydraulic communication with various actuators, sensors, and other devices within (or outside of) the combine 10, including various devices associated with the pumps 60, control valves 62, and so on. The controller 64 may communicate with other systems or devices (including other controllers) in various known ways, including via a CAN bus (not shown) of the combine 10, via wireless or hydraulic communication means, or otherwise. The controller 64 is in communication with at least one sensor 102 and one or more switches 104 associated with the hydraulic actuator lock valve system 100 over a communication medium that facilitates the transfer of power, data, commands, etc., such as a CAN bus. As will be discussed, the controller 64 receives and processes sensor signals received from the sensor 102 and switches 104 of the hydraulic actuator lock valve system 100 and generates one or more control signals to one or more lock valves 106 based on the processing.

Various sensors may also be provided to observe various conditions associated with the combine 10. In some embodiments, various sensors 66 (e.g., pressure, flow or other sensors) may be disposed near the pumps 60 and control valves 62, or elsewhere on the combine 10. For example, sensors 66 observe a pressure associated with the pumps 60 and generate sensor signals based thereon, which are communicated to the controller 64 via the CAN bus, for example.

The hydraulic actuator lock valve system 100 includes the sensor 102, the switches 104 and the lock valves 106. In one example, the sensor 102 includes an operator presence sensor 107. The operator presence sensor 107 is coupled to the cab 26 of the combine 10, and observes whether an operator is present within the cab 26. In one example, the operator presence sensor 107 is a seat mass sensor. In this example, the operator presence sensor 107 is coupled to the operator seat within the cab 26 to observe a mass on the operator seat and generate sensor signals based thereon. The operator presence sensor 107 is in communication with the controller 64, which processes the sensor signals and determines whether an operator is seated on the seat. It should be noted that the operator presence sensor 107 may comprise any suitable sensor for determining a presence of an operator within the cab 26, such as an imaging device, etc.

The switches 104 include an engine start/stop switch 108 and a remote control switch 110. The engine start/stop switch 108 receives an input from an operator, such as a request to start or stop the engine 56. The engine start/stop switch 108 may be a button, lever or other input device. Based on receipt of the input to the engine start/stop switch 108, the engine start/stop switch 108 communicates a signal to the controller 64. The controller 64 processes the received signal and determines whether the operator has requested to start the engine 56 or to stop the engine 56, based on a current operating state of the engine 56. The current operating state of the engine 56 may be provided by other control modules associated with the engine 56, such as an engine control module, for example.

In one example, the remote control switch 110 is coupled to the feederhouse 28. The remote control switch 110 receives an input from an operator, such as a request to lock the feederhouse 28, and thus, the header 44, at a desired position or height relative to the ground 38. The remote control switch 110 may be a button, lever or other input device. Based on receipt of the input to the remote control switch 110, the remote control switch 110 communicates a signal to the controller 64. The controller 64 processes the received signal from the remote control switch 110 and determines whether the operator has requested to lock the feederhouse 28 and/or the header 44 at the current position or height or to unlock the feederhouse 28 and/or the header 44, based on a current position of the lock valves 106. The current position of the lock valves 106 may be stored in a datastore associated with the controller 64.

Figure 2A:
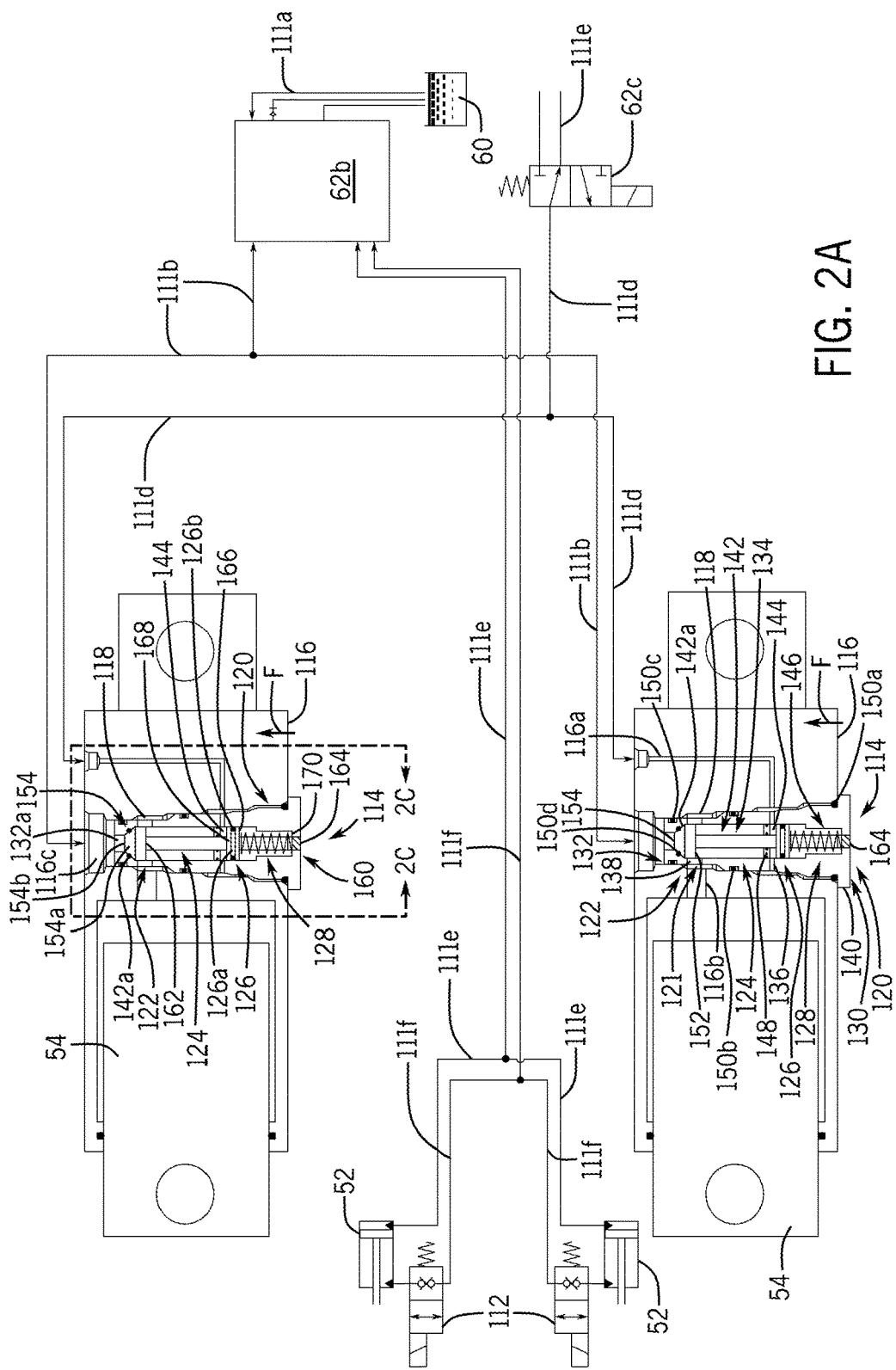
FIG. 2A is a schematic view of a hydraulic actuator lock valve for use with the hydraulic actuator lock valve system of FIG. 1, which illustrates the lock valve in the lock position.

In one example, with reference to FIG. 2A, the lock valves 106 include one or more tilt lock valves 112 and the lift lock valves 114. Generally, the combine 10 includes two tilt lock valves 112, one for each of the tilt hydraulic cylinders 52. The tilt lock valves 112 are responsive to one or more control signals received from the controller 64 to lock the tilt hydraulic cylinders 52 and are responsive to one or more control signals received from the controller 64 to unlock the tilt hydraulic cylinders 52. The tilt lock valves 112 may comprise any suitable blocker valve, such as a double blocker valve and so on. In this example, the tilt lock valves 112 are solenoid activated spring return two way double check valve, which is responsive to the one or more control signals received from the controller 64.

Figure 2B:
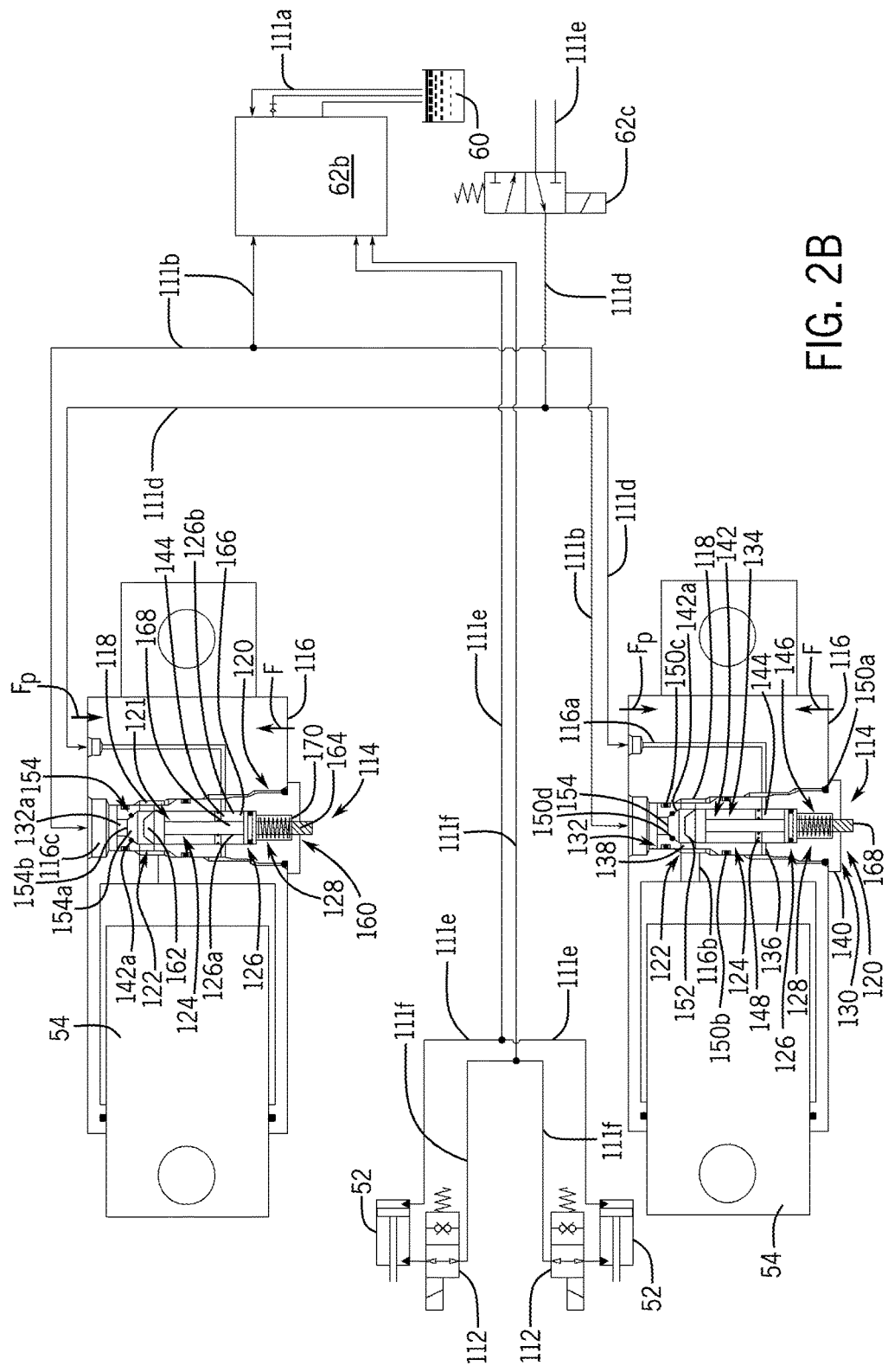
FIG. 2B is a schematic view of the lock valve of FIG. 2A, which illustrates the lock valve in the unlock position.

Generally, the combine 10 includes two lift lock valves 114, one for each of the lift hydraulic cylinders 54. The lift lock valves 114 are responsive to hydraulic fluid received from the pilot control valve 62c to move from a lock position (FIG. 2A) to an unlock position (FIG. 2B). In the unlock position, the lift lock valves 114 enable the lift hydraulic cylinders 54 to be driven by hydraulic fluid supplied by the lift control valve 62b via the pumps 60. In the absence of hydraulic fluid, the lift lock valves 114 are in the lock position, in which hydraulic fluid is inhibited from being supplied to the lift hydraulic cylinders 54, thereby inhibiting the movement of the lift hydraulic cylinders 54. In this example, the lift control valve 62b is in fluid communication with the pumps 60 via a flexible conduit or hose 111a, and is in fluid communication with each of the lift lock valves 114 via one or more flexible conduits or hoses 111b. The pilot control valve 62c is in fluid communication with the pumps 60 via a flexible conduit or hose 111c, and is in fluid communication with each of the lift lock valves 114 via one or more flexible conduits or hoses 111d. The tilt lock valves 112 are each in communication with the lift control valve 62b via one or more flexible conduits or hoses 111e and one or more flexible conduits or hoses 111f.

In one example, the lift lock valves 114 are coupled to a housing 116 of the lift hydraulic cylinders 54. In this example, each of the lift lock valves 114 are removably received within a bore 118 defined within the housing 116 of the lift hydraulic cylinders 54. In one example, the bore 118 is threaded, and each of the lift lock valves 114 include a plurality of threads that threadably engage with the threads of the bore 118 to removably retain the lift lock valves 114 within the housing 116. It should be noted, however, that other techniques may be employed to removably retain the lift lock valves 114 within the housing 116.

Figure 2C:
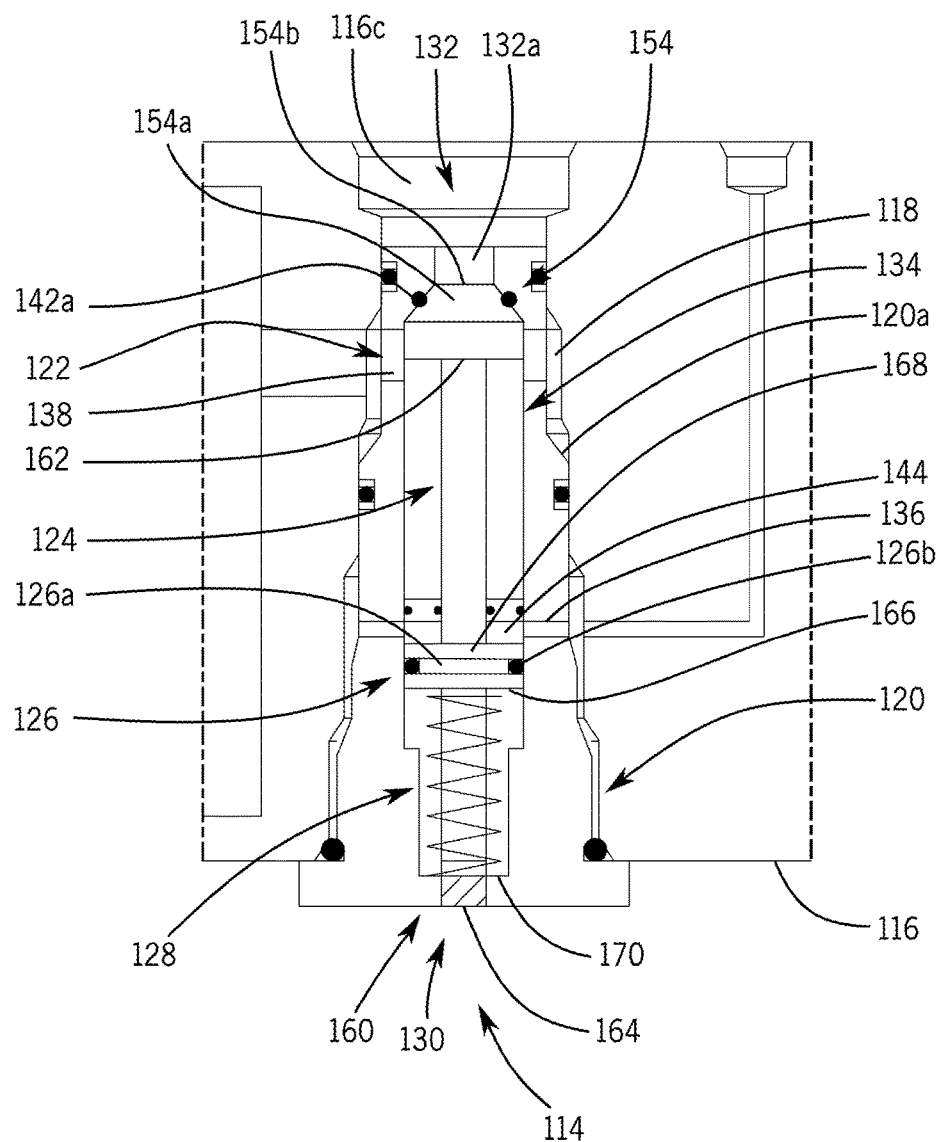
FIG. 2C is a detail schematic view of the lock valve of FIG. 2A, taken along 2C-2C in FIG. 2A.

With additional reference to FIG. 2C, each of the lift lock valves 114 includes a valve housing 120 and a valve body 121 received within the valve housing 120. In one example, the valve body 121 includes a valve seat 122, a rod 124, a head 126 and a biasing member 128. The valve housing 120 has an exterior surface 120a, which includes the plurality of threads for coupling the valve housing 120 to the housing 116. The valve housing 120 has a first end 130 and an opposite, second end 132, and includes a chamber 134 defined within the valve housing 120 from the first end 130 to the second end 132. The valve housing 120 also includes a first fluid passage 136 and a second fluid passage 138 defined through the valve housing 120 between the first end 130 and the second end 132.

With reference to FIG. 2A, the first end 130 includes a flange 140, which in this example, contacts an exterior surface of the housing 116. The second end 132 is received within the housing 116, and is in selective fluid communication with the lift control valve 62b for selectively receiving hydraulic fluid. In one example, the second end 132 includes a bore 132a, which is in fluid communication with a port 116c defined into the housing 116. The port 116c couples the hose 111b to the housing 116 to supply the lift hydraulic cylinder 54 with hydraulic fluid via the lift control valve 62b.

The chamber 134 is defined within an interior of the valve housing 120. The chamber 134 includes a first, lift chamber 142, a second, pilot chamber 144 and a third, biasing chamber 146. The lift chamber 142 is hydraulically isolated from the pilot chamber 144 by a sealing member 148. The sealing member 148 is any sealing member capable of hydraulically isolating the lift chamber 142 from the pilot chamber 144. The lift chamber 142 is defined at the second end 132 and is in selective fluid communication with the lift control valve 62b. The lift chamber 142 includes tapered sidewalls 142a, which cooperate with the valve seat 122 to inhibit or block the flow of hydraulic fluid into the second fluid passage 138.

The pilot chamber 144 is defined between the sealing member 148 and the biasing chamber 146. The pilot chamber 144 has substantially cylindrical sidewalls, and the head 126 is movably received within the pilot chamber 144. The pilot chamber 144 is in selective fluid communication with the pilot control valve 62c to selectively receive hydraulic fluid, which acts on the head 126 disposed within the pilot chamber 144.

The first fluid passage 136 is defined through the exterior surface 120a of the valve housing 120 and is selectively in fluid communication with a pilot fluid conduit 116a defined in the housing 116. The pilot fluid conduit 116a receives hydraulic fluid from the pilot control valve 62c (via the hose 111d) and cooperates with the first fluid passage 136 to enable hydraulic fluid to flow from the pilot control valve 62c into the pilot chamber 144. As will be discussed, the hydraulic fluid from the pilot control valve 62c moves the head 126, and thus, the valve seat 122 into the second, unlock position, thereby enabling fluid communication between the lift control valve 62b and the lift hydraulic cylinder 54. In one example, the first fluid passage 136 is a cross bore that intersects the pilot chamber 144.

The second fluid passage 138 is defined through the exterior surface 120a of the valve housing 120 and is selectively in fluid communication with a bore 116b defined in the housing 116. The second fluid passage 138 selectively cooperates with the bore 116b to provide a conduit for hydraulic fluid from the lift control valve 62b to flow through the valve housing 120 to drive the respective lift hydraulic cylinder 54. In one example, the second fluid passage 138 is a cross bore that intersects the lift chamber 142. The second fluid passage 138 generally has a larger diameter than a diameter of the first fluid passage 136.

It should be noted that the valve housing 120 may include one or more sealing members or seals 150, such as an O-ring, in various positions along the exterior surface 120a of the valve housing 120. In one example, the valve housing 120 includes a seal 150a coupled to the exterior surface 120a so as to be positioned between the flange 140 and the housing 116. The valve housing 120 may also include a seal 150b coupled to the exterior surface 120a so as to be positioned between the first fluid passage 136 and the second fluid passage 138. The valve housing 120 may also include a seal 152b coupled to the exterior surface 120a at the second end 132. In addition, the valve housing 120 may include one or more seals 150 disposed within the chamber 134 of the valve housing 120. In one example, a seal 150d is coupled to the tapered sidewalls 142a of the lift chamber 142.

The valve seat 122 is coupled to the rod 124. The valve seat 122 has a first body end 152 opposite a second body end 154. The first body end 152 is substantially circular and is coupled to the rod 124. The second body end 154 is substantially frustoconical, and has tapered sidewalls 154a that terminate in a flat or planar end 154b. The tapered sidewalls 154a have substantially the same slope as the tapered sidewalls 142a of the lift chamber 142 to enable the valve seat 122 to seal against the lift chamber 142 in the first, locked position. The flat or planar end 154b seals against the bore 132a defined in the second end 132 of the valve seat 122 in the first, locked position.

The rod 124 is substantially cylindrical. The rod 124 has a first rod end 160 and a second, opposite rod end 162. The first rod end 160 includes a visual indicator 164. In one example, the visual indicator 164 is a colored area on the first rod end 160, which may be colored via paint, marker, etc. In one example, the visual indicator 164 is an area on the first rod end 160 that is red in color; however, other colors or a surface treatment may be used. As will be discussed, the visual indicator 164 enables a worker to easily determine the lift lock valve 114 is in the unlock position. In this regard, the first rod end 160 of the rod 124, including the visual indicator 164, extends outwardly from the valve housing 120 (FIG. 2B) to visually indicate the lift lock valve 114 is in the unlock position. The second rod end 162 is coupled to the valve seat 122.

The head 126 is circular, and is coupled to the rod 124 between the first rod end 160 and the second rod end 162. The head 126 is responsive to hydraulic fluid received from the pilot control valve 62c to move the valve seat 122 to the unlock position. The head 126 includes a first head end 166 and an opposite, second head end 168. A channel 126a is defined about a circumference of the head 126 to receive a sealing member 126b, such as an O-ring. The first head end 166 contacts the biasing member 128 and serves as a seat for the biasing member 128. The second head end 168 is in fluid communication with the pilot chamber 144 and is responsive to the hydraulic fluid received in the pilot chamber 144 to compress the biasing member 128. Thus, the head 126 is movable within the chamber 134 based on the hydraulic fluid received from the pilot control valve 62c.

The biasing member 128 is coupled about the rod 124 near the first rod end 160 so as to be positioned between the visual indicator 164 and the first head end 166. The biasing member 128 is received within the biasing chamber 146, which is substantially devoid of hydraulic fluid. In one example, the biasing member 128 is a coil spring; however, other biasing members may be employed. One end of the biasing member 128 contacts and biases against the head 126 and another end of the biasing member 128 contacts or biases against a spring seat 170 defined in the biasing chamber 146 of the valve housing 120.

In one example, the valve seat 122, the rod 124 and the head 126 may be composed of a metal or metal alloy, and may be formed by casting, molding, selective metal sintering, etc. The valve seat 122, the rod 124 and the head 126 may be formed as a monolithic or one-piece, or may comprise discrete components that are coupled together, via welding, for example. The valve housing 120 is also composed of a metal or metal alloy, and may be formed by casting, molding, selective metal sintering, etc. The plurality of threads, the first fluid passage 136, the second fluid passage 138 and the bore 132a may be defined during the forming of the valve housing 120 or may be formed after the valve housing 120 is formed, by machining, for example.

With the valve housing 120 formed, and the valve seat 122 and the head 126 coupled to the rod 124, the seals 150a-d may be coupled to the valve housing 120. The sealing member 126b may be coupled to the channel 126a defined in the head 126. The assembly of the valve seat 122, the head 126 and the rod 124 are inserted into the chamber 134, and the biasing member 128 is compressed and inserted into the chamber 134. The lift lock valve 114 is then coupled to the respective lift hydraulic cylinder 54, which is coupled to the combine 10. In one example, the plurality of threads of the valve housing 120 is threadably coupled to the plurality of threads of the housing 116. The above process is repeated to couple the other lift lock valve 114 to the lift hydraulic cylinder 54.

As will be discussed below, when in the lock position, as shown in FIG. 2A, the planar end 154b of the valve seat 122 seals the bore 132a of the second end 132 of the valve housing 120, inhibiting the flow of hydraulic fluid through the lift lock valve 114 and thereby inhibiting the movement of the lift hydraulic cylinder 54. Thus, the lift lock valve 114 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. The biasing member 128 exerts a force F against the head 126, which maintains the valve seat 122 against the bore 132a. In the lock position, the visual indicator 164 defined on the second rod end 162 is substantially flush with the valve housing 120 to visually indicate that the lift lock valve 114 is in the lock position.

When the hydraulic circuit (i.e. the pilot control valve 62c) is commanded to supply hydraulic fluid from the pumps 60 to the lift lock valves 114, the hydraulic fluid flows through the first fluid passages 136 and acts on the head 126. The hydraulic pressure Fp from the hydraulic fluid is greater than the force F of the biasing member 128 and overcomes the force F of the biasing member 128 to move the head 126 and the valve seat 122, and thus, the lift lock valve 114 to the unlock position, as shown in FIG. 2B. In the unlock position, hydraulic fluid is received from the lift control valve 62b and enters via the port 116c. The hydraulic fluid flows through the bore 132a into the second fluid passage 138 to drive the lift hydraulic cylinder 54. In the unlock position, the visual indicator 164 defined on the second rod end 162 extends outwardly and beyond the valve housing 120 to visually indicate that the lift lock valve 114 is in the unlock position.

The various components noted above (or others) may be utilized by the controller 64 to determine whether to move the lock valves 106 to the lock position or the unlock position. Accordingly, these components may be viewed as forming part of the hydraulic actuator lock valve system 100 for the combine 10. Each of the sensor 102 and the switches 104 are in communication with the controller 64 via a suitable communication architecture, such as a CAN bus.

In various embodiments, the controller 64 receives and processes the sensor signals from the sensor 102 and the engine start/stop switch 108, and determines a position for the lock valves 106. Based on the determination, the controller 64 outputs one or more control signals to move the lock valves 106 to the determined position. The controller 64 also receives and processes the signals from the remote control switch 110 and determines a position for the lock valves 106. Based on this determination, the controller 64 outputs one or more control signals to move the lock valves 106 to the determined position.

Figure 3:
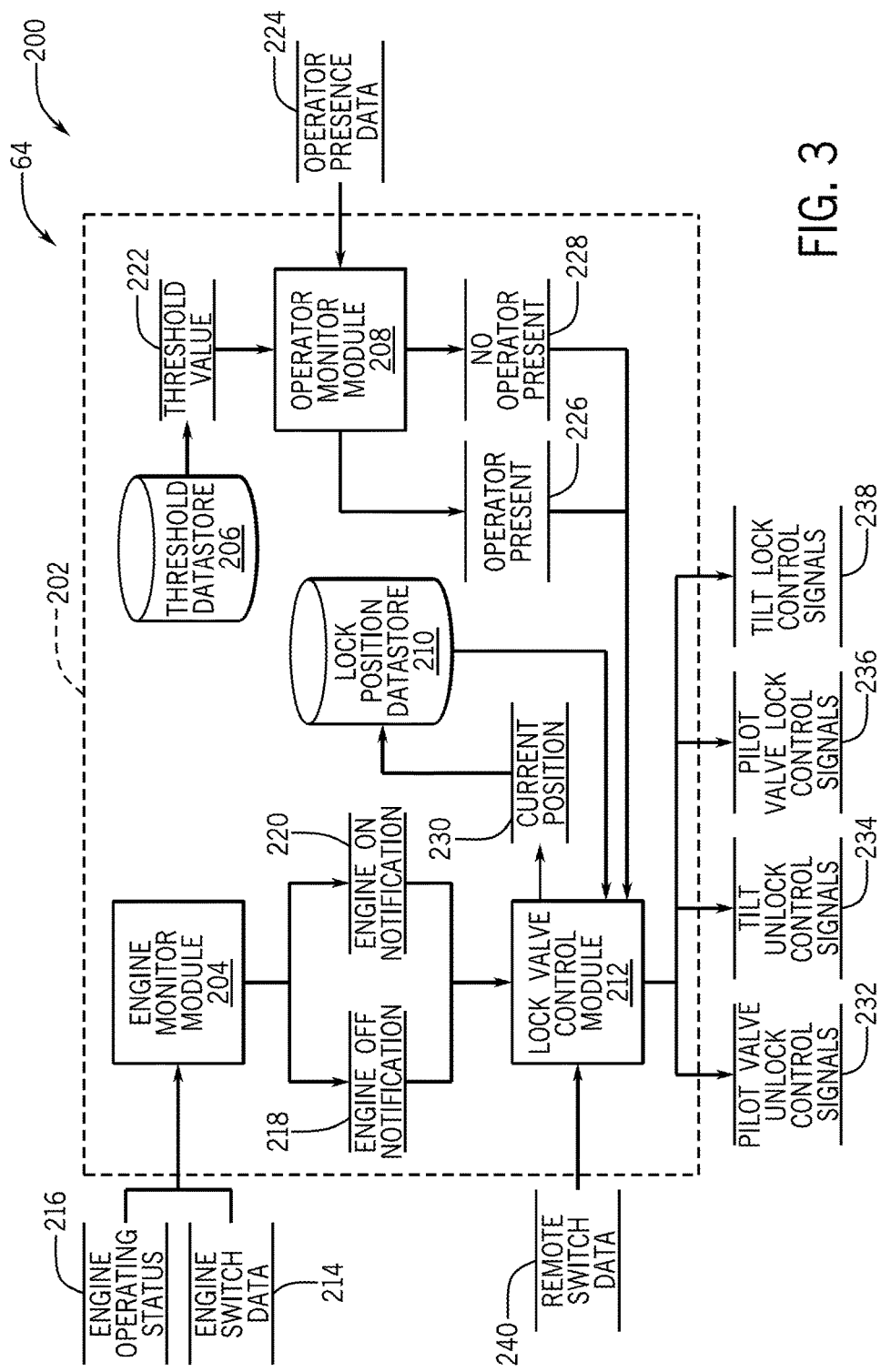
FIG. 3 is a dataflow diagram illustrating an example lock system of the hydraulic actuator lock valve system of FIG. 1 in accordance with various embodiments.

Referring now also to FIG. 3, a dataflow diagram illustrates various embodiments of a lock system 200 of the hydraulic actuator lock valve system 100 for the combine 10, which may be embedded within a control module 202 associated with the controller 64. Various embodiments of the lock system 200 according to the present disclosure can include any number of sub-modules embedded within the control module 202. As can be appreciated, the sub-modules shown in FIG. 3 can be combined and/or further partitioned to similarly output one or more control signals to the pilot control valve 62c and the tilt lock valve 112. Inputs to the lock system 200 are received from the sensor 102 (FIG. 1), received from the switches 104 (FIG. 1), received from other control modules (not shown) associated with the combine 10, and/or determined/modeled by other sub-modules (not shown) within the controller 64. In various embodiments, the control module 202 includes an engine monitor module 204, a threshold datastore 206, an operator monitor module 208, a lock position datastore 210 and a lock valve control module 212.

The engine monitor module 204 receives as input engine switch data 214. The engine switch data 214 is a signal received from the engine start/stop switch 108. The engine monitor module 204 also receives as input engine operating status 216. The engine operating status 216 is received from other control modules associated with the combine 10, such as an engine control module associated with the engine 56. The engine operating status 216 indicates whether the engine 56 is running.

Based on the receipt of the engine switch data 214, the engine monitor module 204 determines whether the engine 56 is running based on the engine operating status. If the engine 56 is running, the engine monitor module 204 interprets the signal from the engine switch data 214 as an engine stop request, and sets engine off notification 218 for the lock valve control module 212. The engine off notification 218 indicates that the engine 56 is powering down or is off.

If the engine 56 is not running (based on the engine operating status), the engine monitor module 204 interprets the signal from the engine switch data 214 as an engine start request, and sets engine on notification 220 for the lock valve control module 212. The engine on notification 220 indicates that the engine is powering on.

The threshold datastore 206 stores data that provides a threshold value 222 for a mass on an operator seat in the cab 26. In one example, based on the operator presence sensor 107 being coupled to the seat below the seat, the threshold is a mass that is greater than a mass of the seat. The threshold value 222 is a pre-defined value, which is factory set. In one example, the threshold for the mass is about 25 pounds; however, the threshold value for the mass may vary based on a mass of the seat.

The operator monitor module 208 receives as input operator presence data 224. The operator presence data 224 is the one or more signals received from the operator presence sensor 107. The operator monitor module 208 processes the one or more signals and determines a mass on the seat in the cab 26. The operator monitor module 208 queries the threshold datastore 206 and retrieves the threshold value 222. The operator monitor module 208 compares the determined mass on the seat from the operator presence data 224 to the threshold value 222. If the determined mass on the seat is greater than the threshold value 222, the operator monitor module 208 sets operator present 226 for the lock valve control module 212. The operator present 226 indicates that an operator is present in the cab 26 of the combine 10. If, however, the determined mass on the seat is less than the threshold value 222, the operator monitor module 208 sets no operator present 228 for the lock valve control module 212. The no operator present 228 indicates that no operator is present in the cab 26 of the combine 10.

The lock position datastore 210 stores data that indicates a current position 230 of the lock valves 106. The lock position datastore 210 is populated by the lock valve control module 212. The lock position datastore 210 may store the current position of the lock valves 106 over multiple engine start/stop cycles, such that the current position of the lock valves 106 (i.e. the last known position) is known to the lock valve control module 212 upon a re-starting of the engine 56.

The lock valve control module 212 receives as input the engine on notification 220. Based on the engine on notification 220, the lock valve control module 212 determines whether an operator is present in the cab 26 based on the receipt of the operator present 226 or the no operator present 228.

Based on the engine on notification 220 and the operator present 226, the lock valve control module 212 queries the lock position datastore 210 and retrieves the current position 230 of the lock valves 106. Based on a current position as the lock position, the lock valve control module 212 generates one or more pilot unlock control signals 232 for the pilot control valve 62c and generates one or more tilt unlock control signals 234 for the tilt lock valves 112. The lock valve control module 212 stores the current position 230 as the unlock position. The one or more pilot unlock control signals 232 is a command for the pilot control valve 62c to supply hydraulic fluid to the lift lock valves 114 to move the lift lock valves 114 from the lock position to the unlock position, thereby enabling movement of the lift hydraulic cylinders 54. The one or more tilt unlock control signals 234 is a command for the tilt lock valves 112 to supply hydraulic fluid to the tilt hydraulic cylinders 52 to enable a movement of the tilt hydraulic cylinders 52.

Based on the engine on notification 220 and the no operator present 228, the lock valve control module 212 queries the lock position datastore 210 and retrieves the current position 230 of the lock valves 106. Based on a current position as the unlock position, the lock valve control module 212 generates one or more pilot lock control signals 236 for the pilot control valve 62c and generates one or more tilt lock control signals 238 for the tilt lock valves 112. The lock valve control module 212 stores the current position 230 as the lock position. The one or more pilot lock control signals 236 is a command for the pilot control valve 62c to cease the supply of hydraulic fluid to the lift lock valves 114, which enables the biasing member 128 to move the lift lock valves 114 from the unlock position to the lock position, thereby inhibiting movement of the lift hydraulic cylinders 54. In this regard, with the supply of hydraulic fluid from the pilot control valve 62c ceased, the biasing member 128 moves the head 126, and thus, the valve seat 122 toward the second end 132 of the valve housing 120 to seal the bore 132a. The one or more tilt lock control signals 238 is a command for the tilt lock valves 112 to inhibit a movement of the tilt hydraulic cylinders 52.

The lock valve control module 212 also receives as input the remote switch data 240. The remote switch data 240 is the one or more signals from the remote control switch 110. The lock valve control module 212 processes the remote switch data 240 determines whether the remote switch data 240 indicates an activation request. In one example, the lock valve control module 212 determines the remote switch data 240 indicates an activation request based on the current position 230 of the lock valves 106 as the unlock position. In this example, based on the remote switch data 240, the lock valve control module 212 queries the lock position datastore 210 and retrieves the current position 230 of the lock valves 106. Based on the current position 230 as the unlock position and the receipt of the remote switch data 240, the lock valve control module 212 determines an activation request has been received, and generates the one or more pilot lock control signals 236 for the pilot control valve 62c and generates the one or more tilt lock control signals 238 for the tilt lock valves 112.

Based on the current position 230 as the lock position and the receipt of the remote switch data 240, the lock valve control module 212 determines a deactivation request has been received, and generates the one or more pilot unlock control signals 232 for the pilot control valve 62c and generates the one or more tilt unlock control signals 234 for the tilt lock valves 112.

Figure 4:
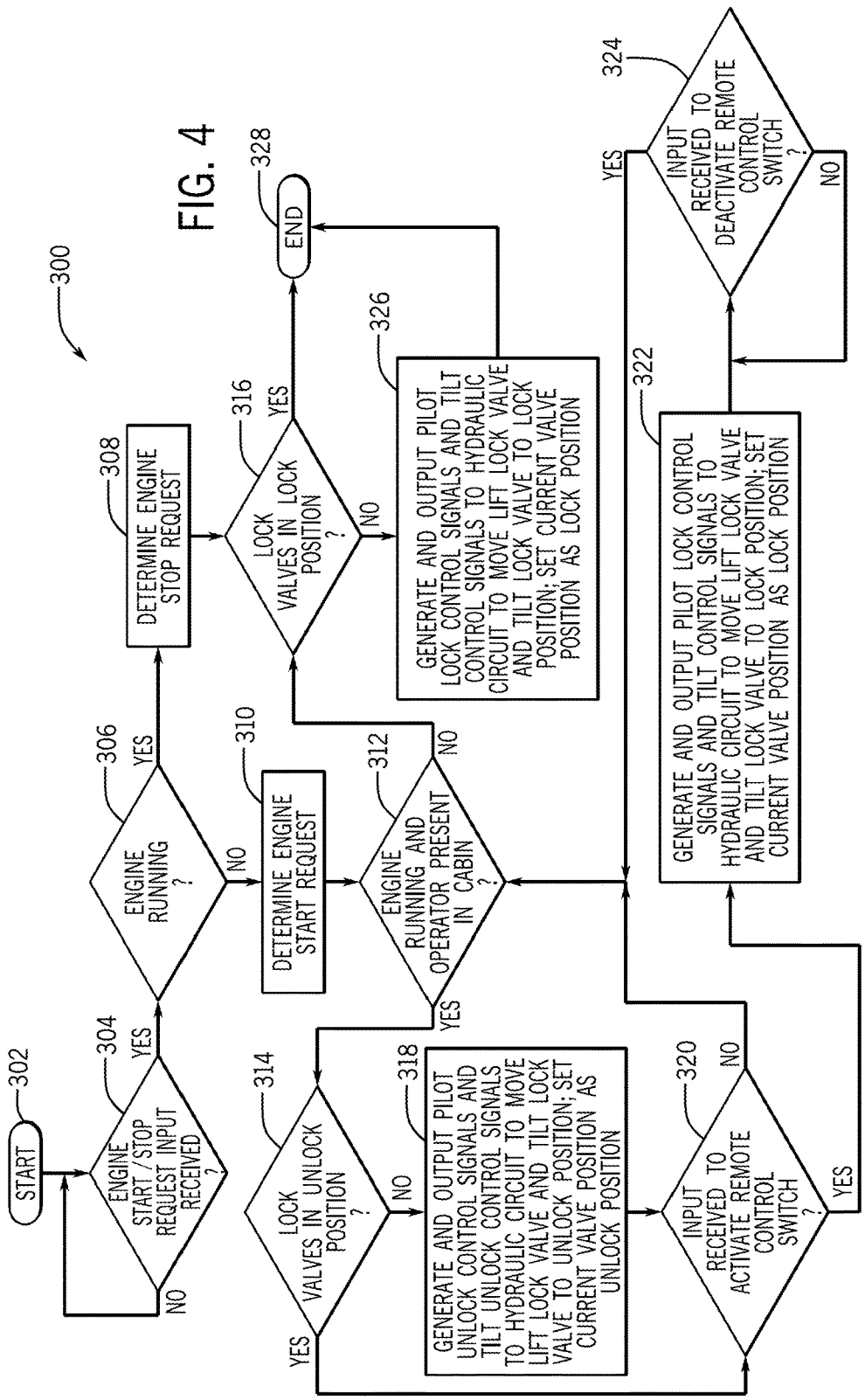
FIG. 4 is a flowchart illustrating an example method of the lock system of the hydraulic actuator lock valve system of FIG. 1 in accordance with various embodiments.

Referring now also to FIG. 4, a flowchart illustrates a method 300 that may be performed by the control module 202 of the controller 64 of FIGS. 1 and 3 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 300 may be scheduled to run based on predetermined events, and/or can run continuously during operation of the combine 10.

In one example, the method begins at 302. At 304, the method determines whether engine switch data 314 has been received, which indicates a request to start/stop the engine 56. If true, the method proceeds to 306. Otherwise, the method loops.

At 306, the method receives the engine operating status 216 and determines whether the engine 56 is running. If true, the method proceeds to 308. Otherwise, at 310, the method determines that the engine switch data 314 indicates a start request for the engine 56. At 312, the method determines whether the engine 56 is running and whether the operator is present in the cab 26. In one example, the method determines the engine 56 is running based on the engine operating status 216. In order to determine whether the operator is present in the cab 26, in one example, the method processes the operator presence data 224 to determine a mass on the seat in the cab 26. The method queries the threshold datastore 206 and retrieves the threshold value 222. The method compares the mass determined from the operator presence data 224 to the threshold value 222, and determines whether the operator is present based on the comparison. In one example, if the mass determined from the operator presence data 224 is greater than the threshold value 222, the operator is determined to be present. If the engine 56 is running and the operator is present in the cab 26, the method proceeds to 314. Otherwise, the method proceeds to 316.

At 314, the method retrieves the current position 230 of the lock valves 106 from the lock position datastore 210 and determines whether the current position 230 is the unlock position. If the current position 230 is the lock position, the method proceeds to 318. Otherwise, the method proceeds to 320.

At 318, the method generates and outputs the pilot unlock control signals 232 to the pilot control valve 62c and the tilt unlock control signals 234 to the tilt lock valves 112 to move the lift lock valves 114 and the tilt lock valves 112, respectively, from the lock position to the unlock position. The method sets the current position 230 as the unlock position.

At 320, the method determines whether input has been received to activate the remote control switch 110. In one example, the method determines whether input has been received to the remote control switch 110 based on the receipt of the remote switch data 240. If remote switch data 240 is received, the method queries the lock position datastore 210 and retrieves the current position 230 of the lock valves 106. Based on the current position 230 of the lock valves 106 as unlock position, the method determines the remote control switch 110 has been activated and proceeds to 322. If no input has been received to the remote control switch 110, the method proceeds to 312.

At 322, the method generates and outputs the pilot lock control signals 236 to the pilot control valve 62c and the tilt lock control signals 238 to the tilt lock valves 112 to move the lift lock valves 114 and the tilt lock valves 112, respectively, from the unlock position to the lock position. The method sets the current position 230 as the lock position.

At 324, the method determines whether input has been received to deactivate the remote control switch 110. In one example, the method determines whether input has been received to the remote control switch 110 based on the receipt of the remote switch data 240. If remote switch data 240 is received, the method queries the lock position datastore 210 and retrieves the current position 230 of the lock valves 106. Based on the current position 230 of the lock valves 106 as lock position, the method determines the remote control switch 110 has been deactivated and proceeds to 312. If no input has been received to the remote control switch 110, the method loops until input is received.

At 308, based on the receipt of engine switch data 314, which indicates a request to start/stop the engine 56 and the engine operating status 216 as running, the method determines that the engine switch data 314 indicates a stop request for the engine 56. At 316, the method retrieves the current position 230 of the lock valves 106 from the lock position datastore 210 and determines whether the current position 230 is the lock position. If the current position 230 is the unlock position, the method proceeds to 326. Otherwise, the method ends at 328.

At 326, the method generates and outputs the pilot lock control signals 236 to the pilot control valve 62c and the tilt lock control signals 238 to the tilt lock valves 112 to move the lift lock valves 114 and the tilt lock valves 112, respectively, from the unlock position to the lock position. The method sets the current position 230 as the lock position. The method ends at 328.

It should be noted that the configuration of the lift lock valves 114 as described herein is not limited to the configuration shown in FIGS. 2A and 2B. In one example, with reference to FIGS. 5A-5C, a lift lock valve 114.1 is shown for use with a respective lift hydraulic cylinder 54. The lift lock valve 114.1 may also be used with the lock system 200 of the hydraulic actuator lock valve system 100. As the lift lock valve 114.1 is similar to the lift lock valve 114 described with regard to FIGS. 2A and 2B, the same reference numerals will be used to denote the same features. In addition, one or both of the warning labels 352, 354 may be employed with the lift lock valve 114.1.

The lift lock valve 114.1 is coupled to the lift hydraulic cylinder 54, and in this example, is removably coupled within the bore 118. In one example, the lift lock valve 114.1 includes a plurality of threads that threadably engage with the threads of the bore 118 to removably retain the lift lock valve 114.1 within the housing 116. It should be noted, however, that other techniques may be employed to removably retain the lift lock valve 114.1 within the housing 116. The lift lock valve 114.1 is responsive to hydraulic fluid received from a pilot control valve 62c.1 to move from the lock position (FIG. 5A) to the unlock position (FIG. 5B). In the unlock position, the lift lock valve 114.1 enables the lift hydraulic actuator 54 to be driven by hydraulic fluid supplied by the lift control valve 62b via the pumps 60. In the absence of hydraulic fluid, the lift lock valve 114.1 is in the lock position, in which hydraulic fluid is inhibited from being supplied to the lift hydraulic cylinder 54, thereby inhibiting the movement of the lift hydraulic cylinder 54.

The lift lock valve 114.1 includes a valve housing 120.1 and a valve body 121.1. The valve body 121.1 includes the valve seat 122, a rod 124.1, the head 126 and the biasing member 128. The valve housing 120.1 has the exterior surface 120a, which includes the plurality of threads for coupling the valve housing 120.1 to the housing 116. The valve housing 120.1 has a first end 130.1 and the opposite, second end 132, and includes a chamber 134.1 defined within the valve housing 120.1 from the first end 130.1 to the second end 132. The valve housing 120.1 also includes the first fluid passage 136, the second fluid passage 138 and a third fluid passage 400 defined through the valve housing 120 between the first end 130.1 and the second end 132.

The first end 130.1 includes a flange 140.1, which in this example, contacts an exterior surface of the housing 116. The flange 140.1 includes a cross bore 402, which is sized to receive a mechanical lock-out pin 404 (FIG. 5C). As will be discussed, the mechanical lock-out pin 404 secures and retains the lift lock valve 114.1 in the lock position. The second end 132 is in fluid communication with the port 116c defined into the housing 116.

The chamber 134.1 is defined within an interior of the valve housing 120.1. The chamber 134.1 includes the lift chamber 142 and the pilot chamber 144. The pilot chamber 144 is defined between the sealing member 148 and an endwall of the chamber 134.1. The head 126 is movably received within the pilot chamber 144. The pilot chamber 144 is in selective fluid communication with the pilot control valve 62c.1 to selectively receive hydraulic fluid, which acts on the head 126 disposed within the pilot chamber 144.

The first fluid passage 136 is defined through the exterior surface 120a of the valve housing 120 and is selectively in fluid communication with a pilot fluid conduit 116a defined in the housing 116. The pilot fluid conduit 116a receives hydraulic fluid from the hydraulic circuit (e.g. the pumps 60 and lift control valve 62b) and is fluidly coupled to the pilot control valve 62c.1. The pilot control valve 62c.1 is in communication with the controller 64, and is responsive to one or more control signals to enable hydraulic fluid to flow into the first fluid passage 136. The flow of hydraulic fluid into the first fluid passage 136 acts on the head 126, and moves the head 126 within the pilot chamber 144 toward the endwall of the chamber 134.1. This movement of the head 126 retracts the valve seat 122, and enables fluid communication between the lift control valve 62b and the lift hydraulic cylinder 54.

The second fluid passage 138 is defined through the exterior surface 120a of the valve housing 120.1 and is selectively in fluid communication with a bore 116b defined in the housing 116. The second fluid passage 138 selectively cooperates with the bore 116b to provide a conduit for hydraulic fluid from the lift control valve 62b to flow through the valve housing 120.1 to drive the respective lift hydraulic cylinder 54.

The third fluid passage 400 is defined through the exterior surface 120a of the valve housing 120.1 and is selectively in fluid communication with a tank fluid passage 116.1 defined in the housing 116. The tank fluid passage 116.1 is in fluid communication with a hydraulic tank associated with the combine 10, which has a pressure that is lower than a pressure within the pilot chamber 144. The tank fluid passage 116.1 is fluidly coupled to the pilot control valve 62c.1 and selectively receives hydraulic fluid from the pilot chamber 144. The pilot control valve 62c.1 is in communication with the controller 64, and is responsive to one or more control signals to enable hydraulic fluid to exit the pilot chamber 144 and flow into the tank fluid passage 116.1 to drain the hydraulic fluid from the pilot chamber 144. The flow of hydraulic fluid into the tank fluid passage 116.1 releases the pressure acting on the head 126 such that the force F of the biasing member 128 moves the valve seat 122 to the lock position. It should be noted that the valve housing 120.1 may include the seals 150 in various positions along the exterior surface 120a of and within the valve housing 120.1. In one example, the valve housing 120.1 includes seals 150a-150f.

The rod 124.1 is substantially cylindrical. The rod 124.1 has a first rod end 160.1 and the second rod end 162. The first rod end 160.1 includes the visual indicator 164. The first rod end 160.1 also includes a throughbore 406. The throughbore 406 cooperates with the cross bore 402 to receive the mechanical lock-out pin 404 (FIG. 5C). In this example, the biasing member 128 is coupled about the rod 124 near the second rod end 162 so as to be positioned between the valve seat 122 and the sealing member 148.

With reference to FIG. 5C, the mechanical lock-out pin 404 is shown coupled to the lift lock valve 114.1. In this example, the mechanical lock-out pin 404 is a tethered pin, having a cylindrical pin 408 with a tether strap 410 that is positionable over an end of the pin 408. In the lock position, the pin 408 is positionable through the cross bore 402 and the throughbore 406 of the rod 124.1 to secure and retain the lift lock valve 114.1 in the lock position.

As the lift lock valve 114.1 may be formed and assembled in a manner similar to that described with regard to the lift lock valve 114, the formation and assembly of the lift lock valve 114.1 will not be discussed in great detail herein. The components of the lift lock valve 114.1 may also be composed of materials similar to or the same as the components of the lift lock valve 114.

Figure 5A:
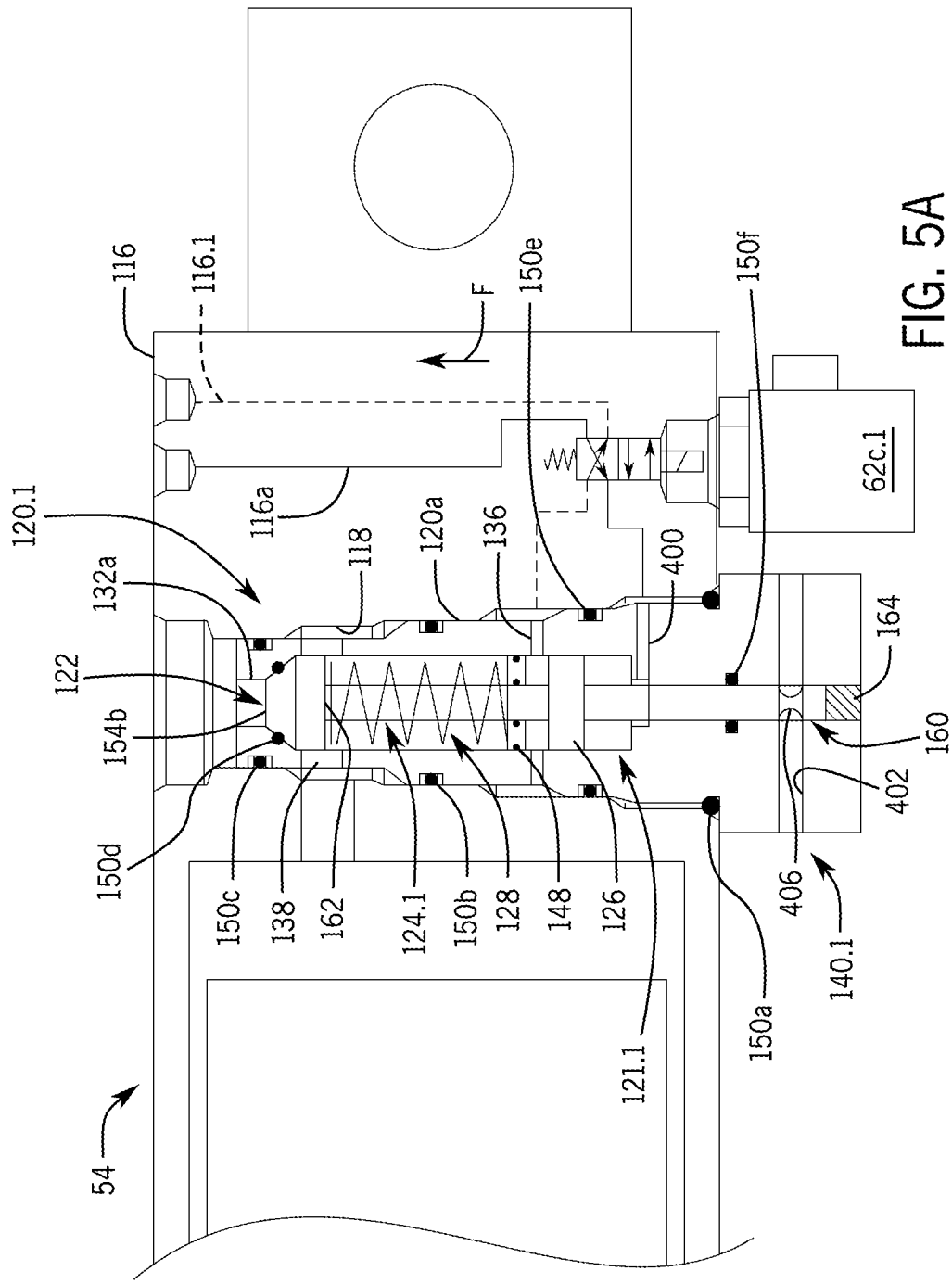
FIG. 5A is a schematic view of another hydraulic actuator lock valve for use with the hydraulic actuator lock valve system of FIG. 1, which illustrates the lock valve in the lock position.
Figure 5B:
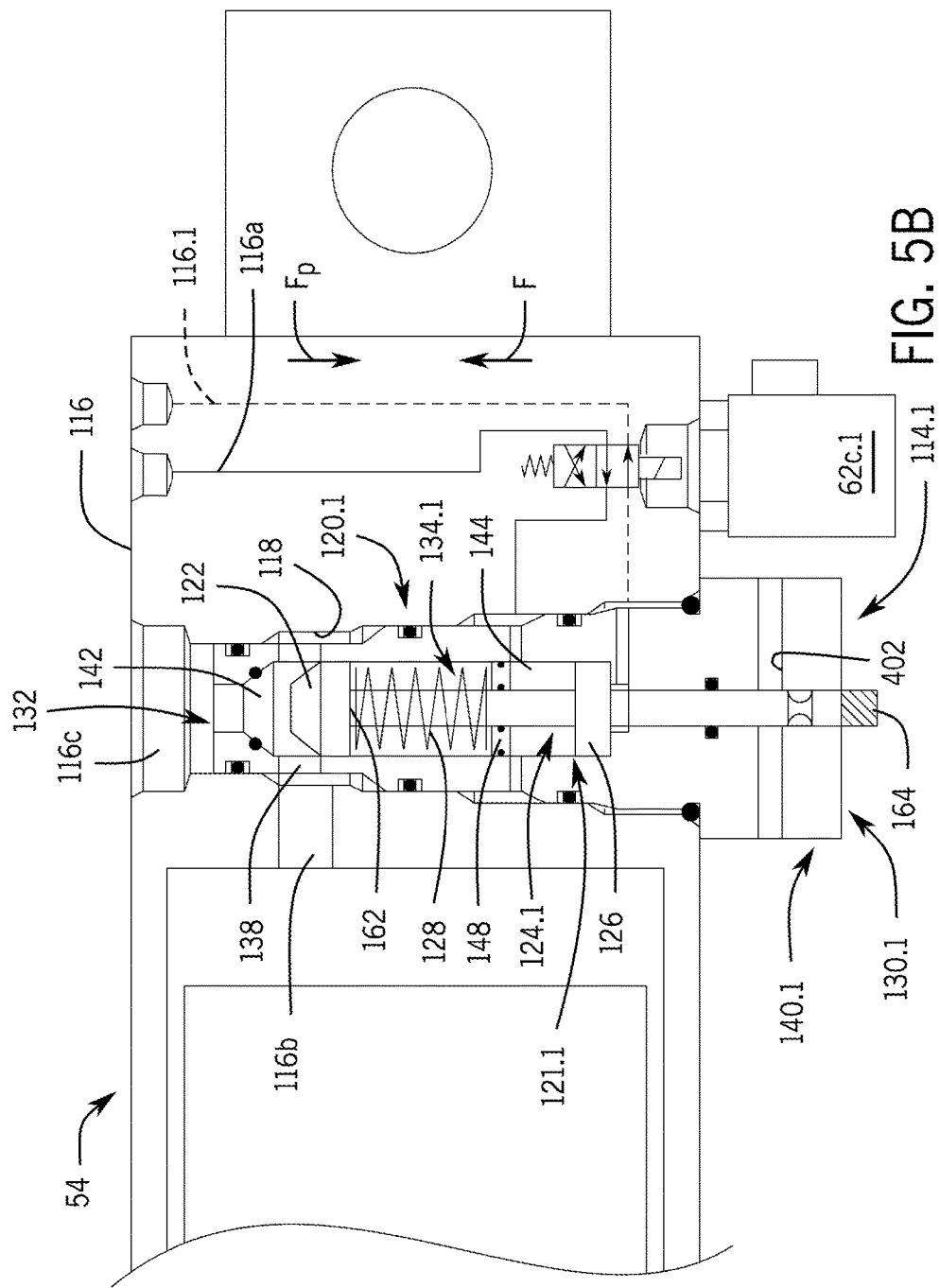
FIG. 5B is a schematic view of the lock valve of FIG. 5A, which illustrates the lock valve in the unlock position.
Figure 5C:
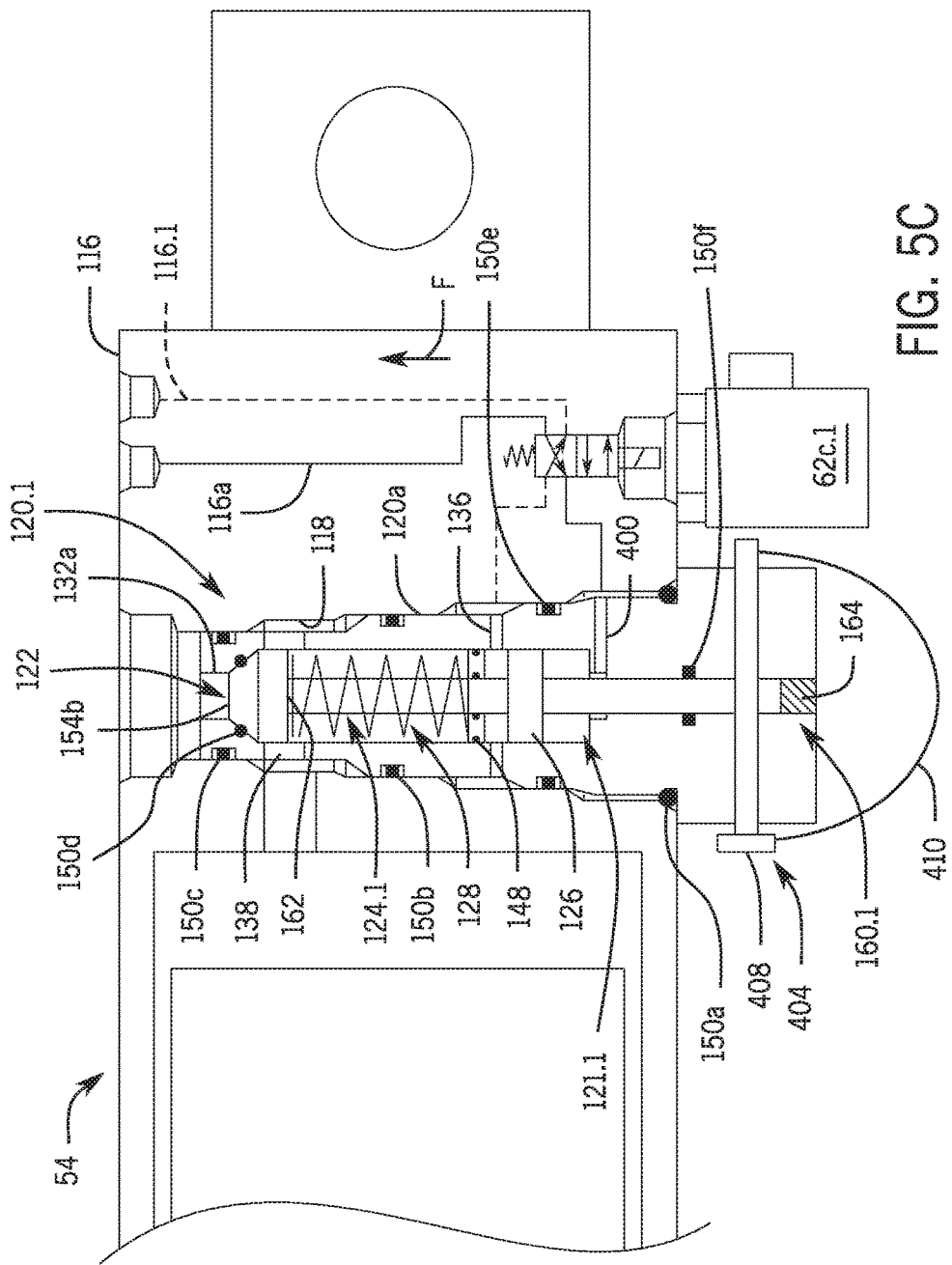
FIG. 5C is a schematic view of the lock valve of FIG. 5A, which illustrates a mechanical lock-out pin received through a portion of the lock valve in the lock position.

When in the lock position, as shown in FIG. 5A, the planar end 154b of the valve seat 122 seals the bore 132a of the second end 132 of the valve housing 120.1, inhibiting the flow of hydraulic fluid through the lift lock valve 114.1 and thereby inhibiting the movement of the lift hydraulic cylinder 54. With brief reference to FIG. 5C, in the lock position, the mechanical lock-out pin 404 may be positioned through the cross bore 402 and the throughbore 406 of the rod 124.1 to secure and retain the lift lock valve 114.1 in the lock position. With reference back to FIG. 5A, the lift lock valve 114.1 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. In this example, the pilot control valve 62c.1 enables flow between the third fluid passage 400 and the tank fluid conduit 116.1 to drain the hydraulic fluid from the pilot chamber 144, thereby enabling the force F of the biasing member 128 to maintain the valve seat 122 in the lock position. In the lock position, the visual indicator 164 defined on the second rod end 162 is substantially flush with the valve housing 120 to visually indicate that the lift lock valve 114.1 is in the lock position.

With reference to FIG. 5B, when the hydraulic circuit (i.e. the pilot control valve 62c.1) is commanded to supply hydraulic fluid from the pumps 60 to the lift lock valve 114.1, the hydraulic fluid flows through the first fluid passages 136 and acts on the head 126. The hydraulic pressure Fp from the hydraulic fluid is greater than the force F and overcomes the force F of the biasing member 128 to move the head 126 and the valve seat 122, and thus, the lift lock valve 114.1 to the unlock position, as shown in FIG. 5B. In the unlock position, hydraulic fluid is received from the lift control valve 62b and enters via the port 116c. The hydraulic fluid flows through the bore 132a into the second fluid passage 138 to drive the lift hydraulic cylinder 54. In the unlock position, the visual indicator 164 defined on the second rod end 162 extends outwardly and beyond the valve housing 120 to visually indicate that the lift lock valve 114.1 is in the unlock position.

Figure 6A:
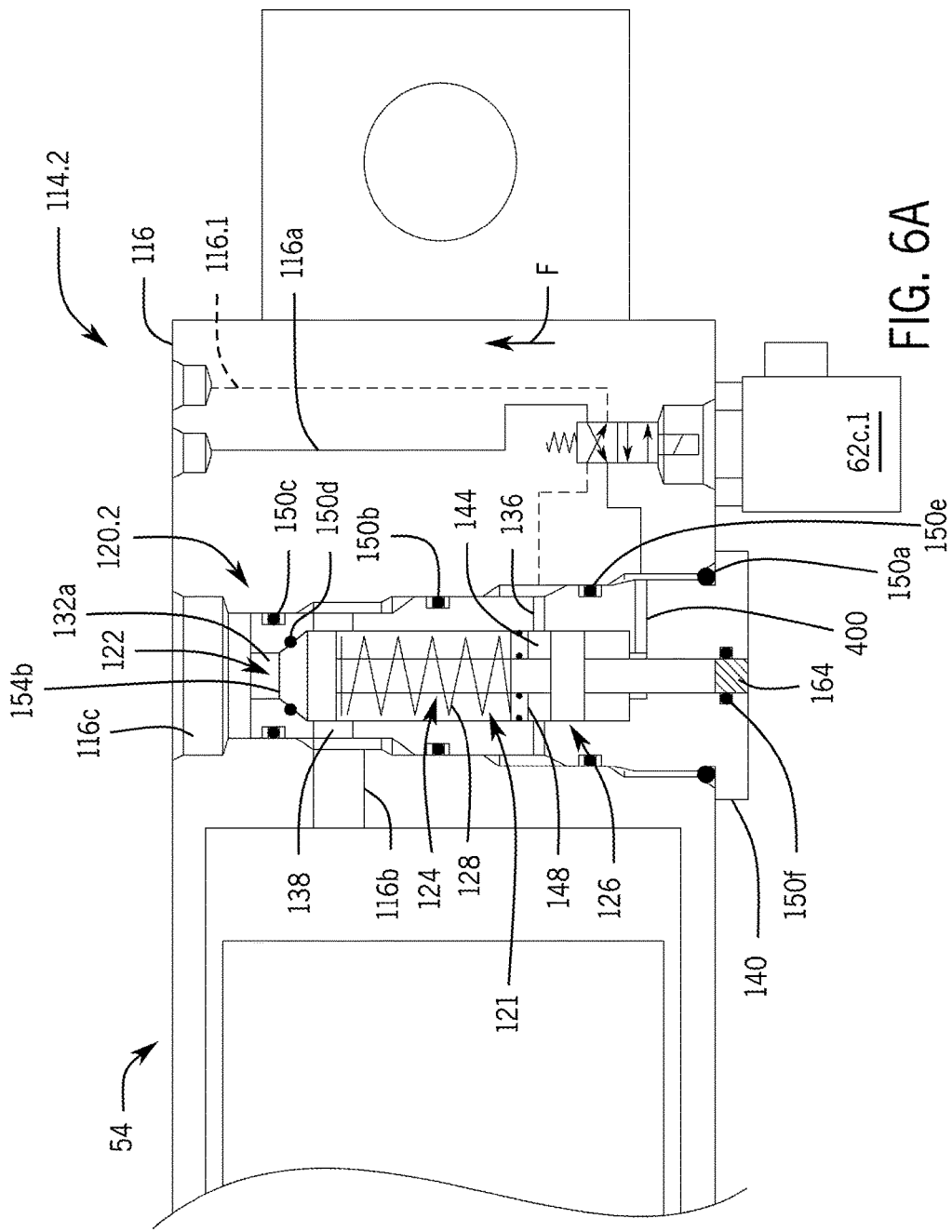
FIG. 6A is a schematic view of another hydraulic actuator lock valve for use with the hydraulic actuator lock valve system of FIG. 1, which illustrates the lock valve in the lock position.
Figure 6B:
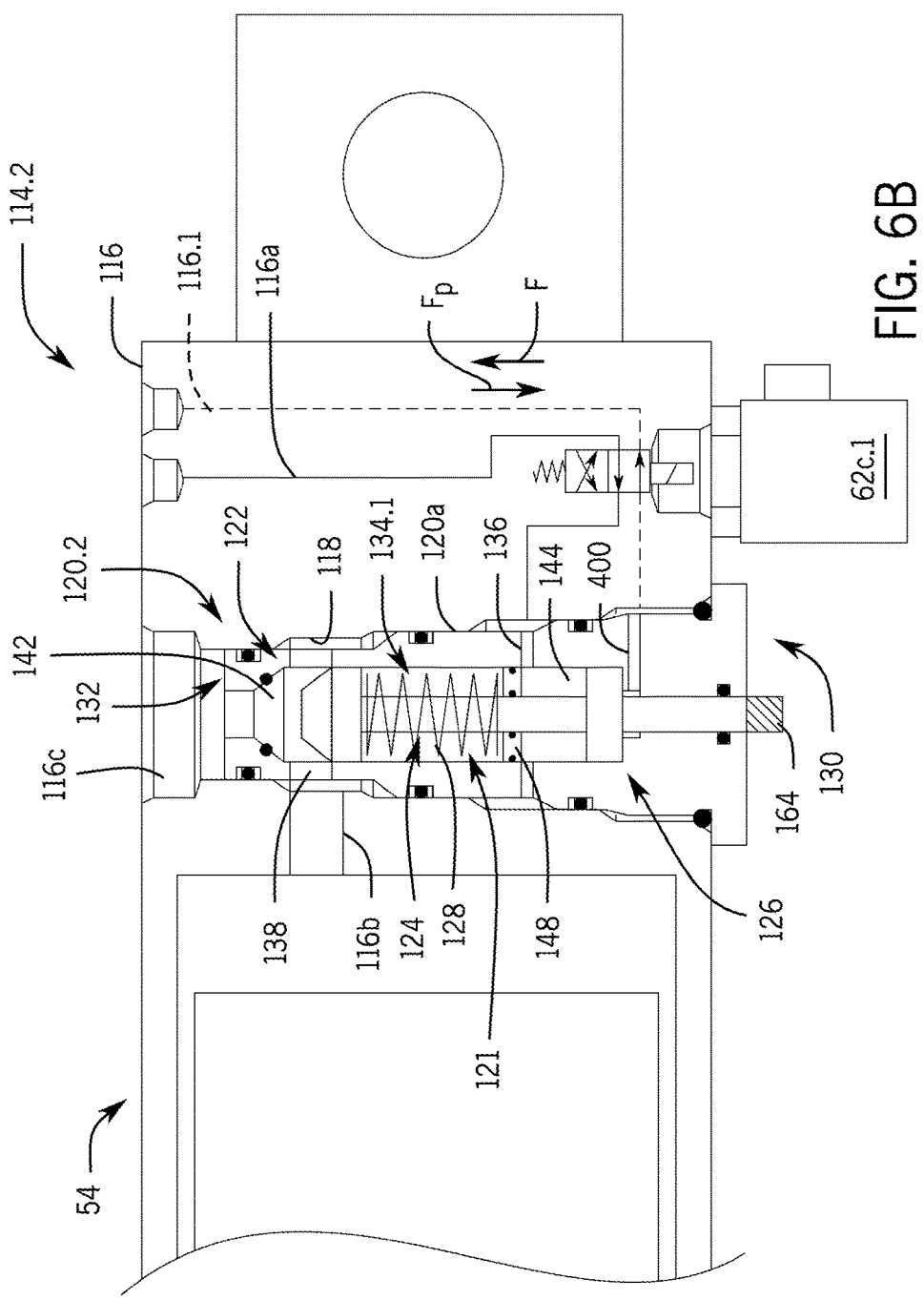
FIG. 6B is a schematic view of the lock valve of FIG. 6A, which illustrates the lock valve in the unlock position.

In one example, with reference to FIGS. 6A-6B, a lift lock valve 114.2 is shown for use with a respective lift hydraulic cylinder 54. The lift lock valve 114.2 may also be used with the lock system 200 of the hydraulic actuator lock valve system 100. The lift lock valve 114.2 may also be used with the lock system 200 of the hydraulic actuator lock valve system 100. As the lift lock valve 114.2 is similar to the lift lock valve 114 described with regard to FIGS. 2A and 2B and the lift lock valve 114.1 described with regard to FIGS. 5A-5C, the same reference numerals will be used to denote the same features. In addition, one or both of the warning labels 352, 354 may be employed with the lift lock valve 114.2.

The lift lock valve 114.2 is coupled to the lift hydraulic cylinder 54, and in this example, is removably coupled within the bore 118. In one example, the lift lock valve 114.2 includes a plurality of threads that threadably engage with the threads of the bore 118 to removably retain the lift lock valve 114.2 within the housing 116. It should be noted, however, that other techniques may be employed to removably retain the lift lock valve 114.2 within the housing 116. The lift lock valve 114.2 is responsive to hydraulic fluid received from the pilot control valve 62c.1 to move from the lock position (FIG. 6A) to the unlock position (FIG. 6B). In the unlock position, the lift lock valve 114.2 enables the lift hydraulic actuator 54 to be driven by hydraulic fluid supplied by the lift control valve 62b via the pumps 60. In the absence of hydraulic fluid, the lift lock valve 114.2 is in the lock position, in which hydraulic fluid is inhibited from being supplied to the lift hydraulic cylinder 54, thereby inhibiting the movement of the lift hydraulic cylinder 54.

The lift lock valve 114.2 includes a valve housing 120.2 and the valve body 121. The valve body 121 includes the valve seat 122, a rod 124, the head 126 and the biasing member 128. The valve housing 120.2 has the exterior surface 120a, which includes the plurality of threads for coupling the valve housing 120.2 to the housing 116. The valve housing 120.2 has the first end 130 and the second end 132, and includes the chamber 134.1 defined within the valve housing 120.2 from the first end 130 to the second end 132. The valve housing 120.2 also includes the first fluid passage 136, the second fluid passage 138 and the third fluid passage 400 defined through the valve housing 120 between the first end 130 and the second end 132.

The first fluid passage 136 is selectively in fluid communication with a pilot fluid conduit 116a defined in the housing 116. The pilot control valve 62c.1 is in communication with the controller 64, and is responsive to one or more control signals to enable hydraulic fluid to flow into the first fluid passage 136. The flow of hydraulic fluid into the first fluid passage 136 acts on the head 126, and moves the head 126 within the pilot chamber 144 toward the endwall of the chamber 134.1. This movement of the head 126 retracts the valve seat 122, and enables fluid communication between the lift control valve 62b and the lift hydraulic cylinder 54. The second fluid passage 138 is selectively in fluid communication with the bore 116*b* defined in the housing 116. The second fluid passage 138 selectively cooperates with the bore 116*b* to provide a conduit for hydraulic fluid from the lift control valve 62*b* to flow through the valve housing 120.1 to drive the respective lift hydraulic cylinder 54. The third fluid passage 400 is selectively in fluid communication with the tank fluid passage 116.1 defined in the housing 116. The tank fluid passage 116.1 is fluidly coupled to the pilot control valve 62*c*.1 and selectively receives hydraulic fluid from the pilot chamber 144. The pilot control valve 62*c*.1 is in communication with the controller 64, and is responsive to one or more control signals to enable hydraulic fluid to exit the pilot chamber 144 and flow into the tank fluid passage 116.1 to drain the hydraulic fluid from the pilot chamber 144. The flow of hydraulic fluid into the tank fluid passage 116.1 releases the pressure acting on the head 126 such that the force F of the biasing member 128 moves the valve seat 122 to the lock position. It should be noted that the valve housing 120.1 may include the seals 150*a*-150*f* in various positions along the exterior surface 120*a* and within the valve housing 120.1.

As the lift lock valve 114.2 may be formed and assembled in a manner similar to that described with regard to the lift lock valve 114, the formation and assembly of the lift lock valve 114.2 will not be discussed in great detail herein. The components of the lift lock valve 114.2 may also be composed of materials similar to or the same as the components of the lift lock valve 114.

When in the lock position, as shown in FIG. 6A, the planar end 154*b* of the valve seat 122 seals the bore 132*a* of the second end 132 of the valve housing 120.2, inhibiting the flow of hydraulic fluid through the lift lock valve 114.2 and thereby inhibiting the movement of the lift hydraulic cylinder 54. The lift lock valve 114.2 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. In this example, the pilot control valve 62*c*.1 enables flow between the third fluid passage 400 and the tank fluid conduit 116.1 to drain the hydraulic fluid from the pilot chamber 144, thereby enabling the force F of the biasing member 128 to maintain the valve seat 122 in the lock position. In the lock position, the visual indicator 164 defined on the second rod end 162 is substantially flush with the valve housing 120 to visually indicate that the lift lock valve 114.2 is in the lock position.

With reference to FIG. 6B, when the hydraulic circuit (i.e. the pilot control valve 62*c*.1) is commanded to supply hydraulic fluid from the pumps 60 to the lift lock valve 114.2, the hydraulic fluid flows through the first fluid passages 136 and acts on the head 126. The hydraulic pressure Fp from the hydraulic fluid that acts on the head 126 is greater than the force F and overcomes the force F of the biasing member 128 to move the head 126, the valve seat 122, and thus, the lift lock valve 114.2 to the unlock position, as shown in FIG. 6B. In the unlock position, hydraulic fluid is received from the lift control valve 62*b* and enters via the port 116*c*. The hydraulic fluid flows through the bore 132*a* into the second fluid passage 138 to drive the lift hydraulic cylinder 54. In the unlock position, the visual indicator 164 defined on the second rod end 162 extends outwardly and beyond the valve housing 120 to visually indicate that the lift lock valve 114.2 is in the unlock position.

Figure 7A:
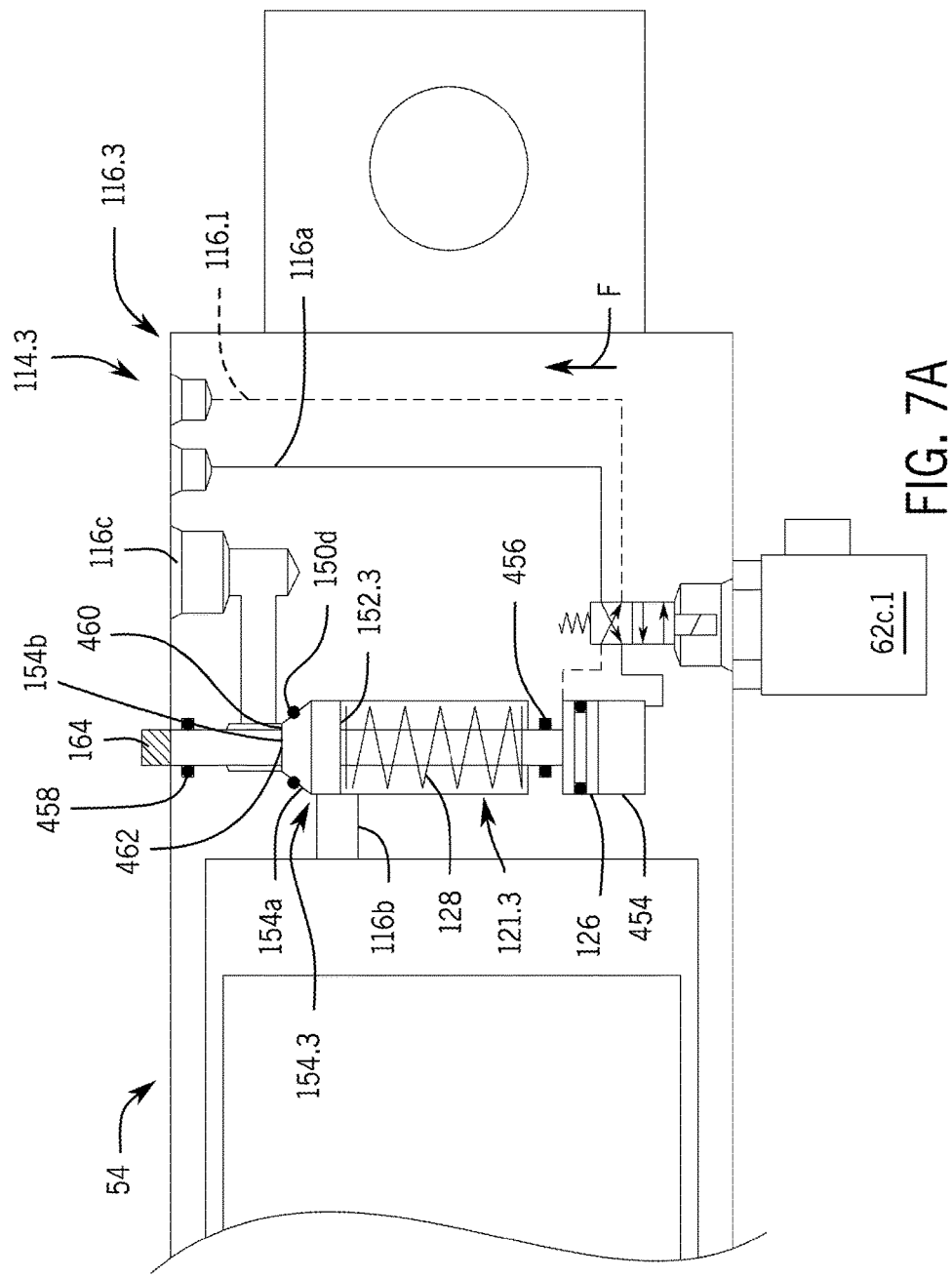
FIG. 7A is a schematic view of another hydraulic actuator lock valve for use with the hydraulic actuator lock valve system of FIG. 1, which illustrates the lock valve in the lock position.
Figure 7B:
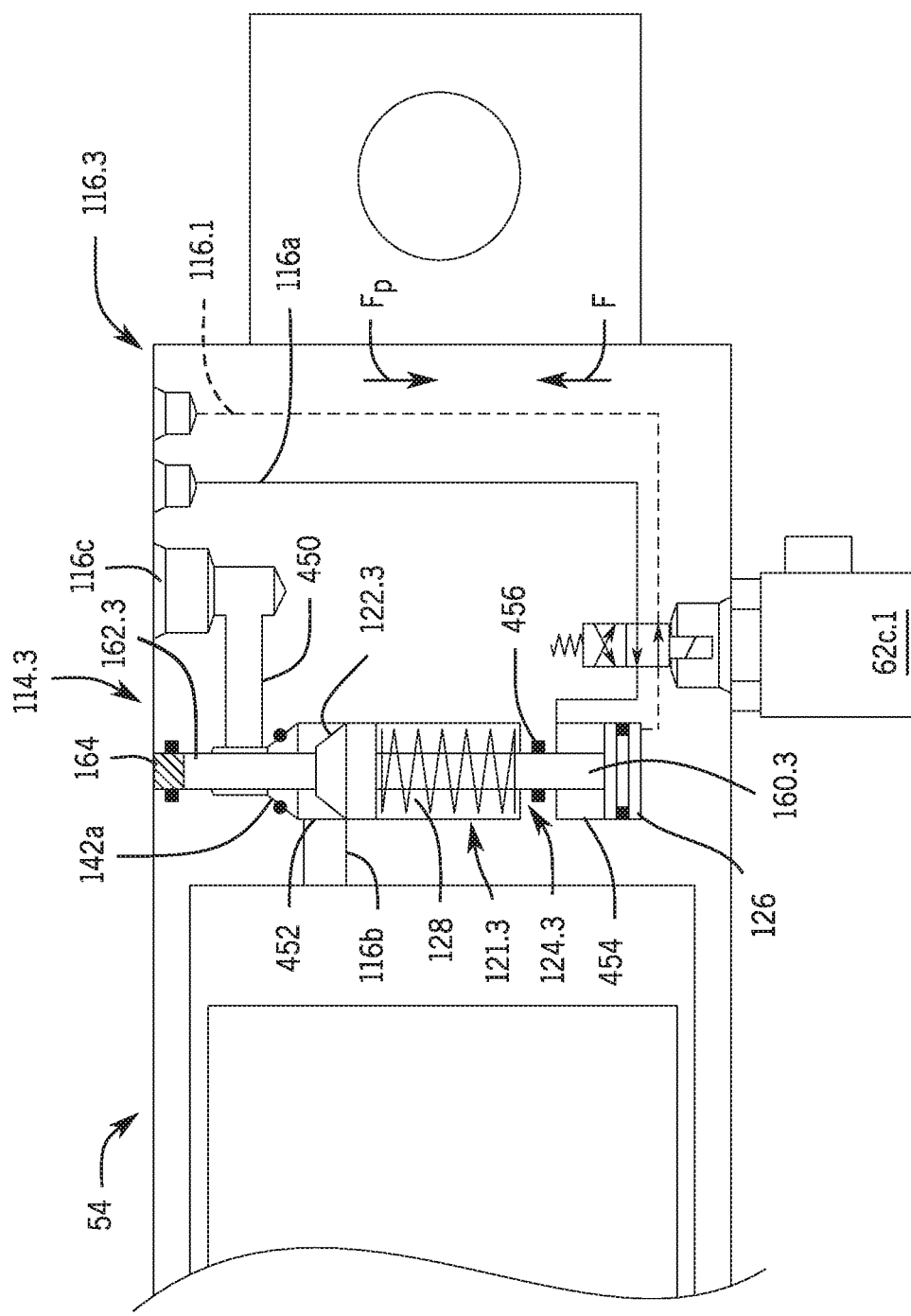
FIG. 7B is a schematic view of the lock valve of FIG. 7A, which illustrates the lock valve in the unlock position.

In one example, with reference to FIGS. 7A-7B, a lift lock valve 114.3 is shown for use with a respective lift hydraulic cylinder 54. The lift lock valve 114.3 may also be used with the lock system 200 of the hydraulic actuator lock valve system 100. As the lift lock valve 114.3 is similar to the lift lock valve 114 described with regard to FIGS. 2A and 2B and the lift lock valve 114.1 described with regard to FIGS. 5A-5C, the same reference numerals will be used to denote the same features. In addition, one or both of the warning labels 352, 354 may be employed with the lift lock valve 114.3.

The lift lock valve 114.3 is coupled to the lift hydraulic cylinder 54, and in this example, is coupled within a housing 116.3 of the lift hydraulic cylinder 54. The lift lock valve 114.3 is responsive to hydraulic fluid received from the pilot control valve 62*c*.1 to move from the lock position (FIG. 7A) to the unlock position (FIG. 7B). In the unlock position, the lift lock valve 114.3 enables the lift hydraulic actuator 54 to be driven by hydraulic fluid supplied by the lift control valve 62*b* via the pumps 60. In the absence of hydraulic fluid, the lift lock valve 114.3 is in the lock position, in which hydraulic fluid is inhibited from being supplied to the lift hydraulic cylinder 54, thereby inhibiting the movement of the lift hydraulic cylinder 54.

In this example, the housing 116.3 of the lift hydraulic cylinder 54 defines a first conduit 450, a lift chamber 452 and a pilot chamber 454. The housing 116.3 also defines the bore 116*b*, the pilot fluid conduit 116*a* and the tank fluid conduit 116.1. The first conduit 450 is in fluid communication with the port 116*c* and the lift chamber 452. The lift chamber 452 is in selective fluid communication with the bore 116*b*. The lift chamber 452 includes tapered sidewalls 142*a* that enable a valve seat 122.3 of the lift lock valve 114.3 to seal against the lift chamber 452 in the lock position. The lift chamber 452 is hydraulically isolated from the pilot chamber 454 by a sealing member 456, such as an O-ring. The pilot chamber 144 is in selective fluid communication with the pilot fluid conduit 116*a* and is in selective fluid communication with the tank fluid conduit 116.1. The first conduit 450, the lift chamber 452, the pilot chamber 454, the bore 116*b*, the pilot fluid conduit 116*a* and the tank fluid conduit 116.1 may be machined in the housing 116.3, or may be formed with the housing 116.3 via investment casting, etc. The housing 116.3 may also include one or more sealing members 458, such as O-rings, to retain the hydraulic fluid within the valve housing 120.4.

The pilot fluid conduit 116*a* is fluidly coupled to the pilot control valve 62*c*.1. The pilot control valve 62*c*.1 is in communication with the controller 64. The pilot control valve 62*c*.1 is responsive to one or more control signals to enable hydraulic fluid to flow into the pilot chamber 454. The pilot control valve 62*c*.1 is also responsive to one or more control signals to enable hydraulic fluid to exit the pilot chamber 454 and flow into the tank fluid passage 116.1 to drain the hydraulic fluid from the pilot chamber 454.

The lift lock valve 114.3 includes a valve body 121.3, which includes a valve seat 122.3, a rod 124.3, the head 126 and the biasing member 128. The valve seat 122.3 is coupled to the rod 124.3, and is disposed within the lift chamber 452. The valve seat 122.3 has a first body end 152.3, an opposite second body end 154.3 and defines a central bore 462. The first body end 152.3 is substantially circular. The second body end 154.3 is substantially frustoconical, and has the tapered sidewalls 154*a* that terminate in the planar end 154*b*. The planar end 154*b* of the valve seat 122.3 seals against a bore 460 defined in the lift chamber 452 to inhibit the flow of hydraulic fluid into the lift chamber 452, and thus, inhibit a movement of the lift hydraulic cylinder 54. The central bore 462 is defined through the valve seat 122.3 from the first body end 152.3 to the second body end 154.3. The central bore 462 receives the rod 124.3 and couples the valve seat 122.3 to the rod 124.3.

The rod 124.3 is substantially cylindrical. The rod 124.3 has a first rod end 160.3 and a second rod end 162.3. The first rod end 160.3 is coupled to the head 126 and is disposed in the pilot chamber 454. The second rod end 162.3 includes the visual indicator 164, and is disposed in the lift chamber 452. In this example, the valve seat 122.3 is coupled to the rod 124.3 between the first rod end 160.3 and the second rod end 162.3 and is disposed within the lift chamber 452. The biasing member 128 is coupled about the rod 124.3 near the second rod end 162.3 so as to be positioned between the valve seat 122.3 and an endwall of the lift chamber 452.

As the lift lock valve 114.3 may be formed and assembled in a manner similar to that described with regard to the lift lock valve 114, the formation and assembly of the lift lock valve 114.3 will not be discussed in great detail herein. The components of the lift lock valve 114.3 may also be composed of materials similar to or the same as the components of the lift lock valve 114.

When in the lock position, as shown in FIG. 7A, the planar end 154*b* of the valve seat 122.3 seals the bore 460 of the lift chamber 452, inhibiting the flow of hydraulic fluid through the lift lock valve 114.3 and thereby inhibiting the movement of the lift hydraulic cylinder 54. The lift lock valve 114.3 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. In this example, the pilot control valve 62*c*.1 enables flow between the pilot chamber 454 and the tank fluid conduit 116.1 to drain the hydraulic fluid from the pilot chamber 454, thereby enabling the force F of the biasing member 128 to maintain the valve seat 122 in the lock position. In the lock position, the visual indicator 164 defined on the first rod end 160.3 extends outwardly and beyond the housing 116.3 to visually indicate that the lift lock valve 114.3 is in the lock position.

With reference to FIG. 7B, when the hydraulic circuit (i.e. the pilot control valve 62*c*.1) is commanded to supply hydraulic fluid from the pumps 60 to the lift lock valve 114.3, the hydraulic fluid flows through the pilot fluid conduit 116*a* and acts on the head 126. The hydraulic pressure Fp from the hydraulic fluid that acts on the head 126 is greater than the force F and overcomes the force F of the biasing member 128 to move the head 126 and the valve seat 122.3, and thus, the lift lock valve 114.3 to the unlock position. In the unlock position, hydraulic fluid is received from the lift control valve 62*b* and enters via the port 116*c*. The hydraulic fluid flows through the bore 460 into the lift chamber 452 and from the lift chamber 452 to the bore 116*b* to drive the lift hydraulic cylinder 54. In the unlock position, the visual indicator 164 defined on the first rod end 160.3 is substantially recessed within the housing 116.3 to visually indicate that the lift lock valve 114.3 is in the lock position.

Figure 8A:
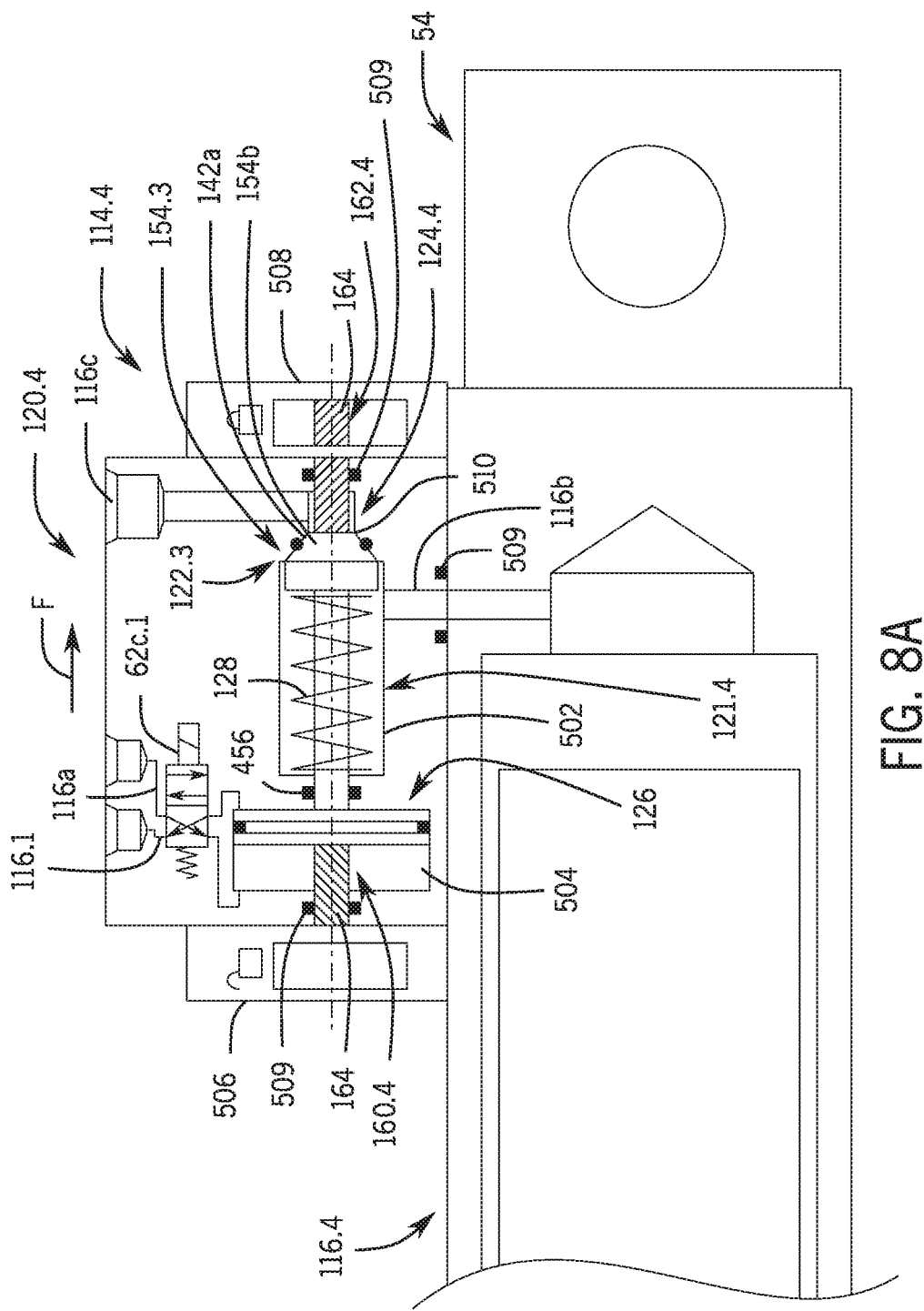
FIG. 8A is a schematic view of another hydraulic actuator lock valve for use with the hydraulic actuator lock valve system of FIG. 1, which illustrates the lock valve in the lock position.

In one example, with reference to FIGS. 8A-8B, a lift lock valve 114.4 is shown for use with a respective lift hydraulic cylinder 54. The lift lock valve 114.4 may also be used with the lock system 200 of the hydraulic actuator lock valve system 100. As the lift lock valve 114.4 is similar to the lift lock valve 114 described with regard to FIGS. 2A and 2B, the lift lock valve 114.1 described with regard to FIGS. 5A-5C and the lift lock valve 114.3 described with regard to FIGS. 7A and 7B, the same reference numerals will be used to denote the same features. In addition, one or both of the warning labels 352, 354 may be employed with the lift lock valve 114.4.

The lift lock valve 114.4 is coupled to the lift hydraulic cylinder 54, and in this example, is coupled to an exterior surface of a housing 116.4 of the lift hydraulic cylinder 54. The lift lock valve 114.4 is responsive to hydraulic fluid received from the pilot control valve 62*c*.1 to move from the lock position (FIG. 8A) to the unlock position (FIG. 8B). In the unlock position, the lift lock valve 114.4 enables the lift hydraulic actuator 54 to be driven by hydraulic fluid supplied by the lift control valve 62*b* via the pumps 60. In the absence of hydraulic fluid, the lift lock valve 114.4 is in the lock position, in which hydraulic fluid is inhibited from being supplied to the lift hydraulic cylinder 54, thereby inhibiting the movement of the lift hydraulic cylinder 54.

In this example, the lift lock valve 114.3 includes a valve housing 120.4, the valve seat 122.3, a rod 124.4, the head 126 and the biasing member 128. The valve housing 120.4 defines a first conduit 500, a first, lift chamber 502, a second, pilot chamber 504, a first unlock indicator window 506 and a second lock indicator window 508. The valve housing 120.4 also defines the bore 116*b*, the pilot fluid conduit 116*a*, the tank fluid conduit 116.1 and the port 116*c*. The first conduit 500 is in fluid communication with the port 116*c* and the lift chamber 502. The lift chamber 502 is in selective fluid communication with the bore 116*b*. The lift chamber 502 includes tapered sidewalls 142*a* that enable the valve seat 122.3 to seal against the lift chamber 502 in the lock position. The lift chamber 452 is hydraulically isolated from the pilot chamber 454 by the sealing member 456. The pilot chamber 504 is in selective fluid communication with the pilot fluid conduit 116*a* and is in selective fluid communication with the tank fluid conduit 116.1. The valve housing 120.4 is generally composed of a metal or metal alloy, and the first conduit 500, the lift chamber 502, the pilot chamber 504, the bore 116*b*, the port 116*c*, the pilot fluid conduit 116*a* and the tank fluid conduit 116.1 may be machined in the valve housing 120.4, or may be formed with the valve housing 120.4 via investment casting, etc. The valve housing 120.4 may also include one or more sealing members 509, such as O-rings, to retain the hydraulic fluid within the valve housing 120.4.

The first unlock indicator window 506 and the second lock indicator window 508 may be discrete from the valve housing 120.4, and may be composed of a transparent polymeric material, for example, which is coupled to the valve housing 120.4 via one or more mechanical fasteners. The first unlock indicator window 506 receives a portion of the rod 124.4 when the lift lock valve 114.4 is in the unlock position to visually indicate the current position of the lift lock valve 114.4. The second lock indicator window 508 receives a portion of the rod 124.4 when the lift lock valve 114.4 is in the lock position to visually indicate the current position of the lift lock valve 114.4.

The pilot fluid conduit 116*a* is fluidly coupled to the pilot control valve 62*c*.1. The pilot control valve 62*c*.1 is in communication with the controller 64. The pilot control valve 62*c*.1 is responsive to one or more control signals to enable hydraulic fluid to flow into the pilot chamber 504. The pilot control valve 62*c*.1 is also responsive to one or more control signals to enable hydraulic fluid to exit the pilot chamber 504 and flow into the tank fluid passage 116.1 to drain the hydraulic fluid from the pilot chamber 504.

The valve seat 122.3 is coupled to the rod 124.4, and is disposed within the lift chamber 452. The second body end 154.3 is substantially frustoconical, and has the tapered sidewalls 154a that terminate in the planar end 154b. The planar end 154b of the valve seat 122.3 seals against a bore 510 defined in the lift chamber 502 to inhibit the flow of hydraulic fluid into the lift chamber 502, and thus, inhibit a movement of the lift hydraulic cylinder 54.

The rod 124.4 is substantially cylindrical. The rod 124.4 has a first rod end 160.4 and a second rod end 162.4. The first rod end 160.4 is coupled to the head 126 and is disposed in the pilot chamber 504. The first rod end 160.4 includes the visual indicator 164, which is received within the first unlock indicator window 506 to visually indicate that the lift lock valve 114.4 is in the unlock position (FIG. 8B). The second rod end 162.4 also includes the visual indicator 164, which is received within the second lock indicator window 508 to visually indicate that the lift lock valve 114.4 is in the lock position (FIG. 8A). In this example, the valve seat 122.3 is coupled to the rod 124.4 between the first rod end 160.4 and the second rod end 162.4, and is disposed within the lift chamber 502. The biasing member 128 is coupled about the rod 124.4 near the second rod end 162.4 so as to be positioned between the valve seat 122.3 and an endwall of the lift chamber 502.

As the lift lock valve 114.4 may be formed and assembled in a manner similar to that described previously herein, the formation and assembly of the lift lock valve 114.4 will not be discussed in great detail herein. The valve seat 122.3, the rod 124.4, the head 126 and the biasing member 128 of the lift lock valve 114.4 may also be composed of materials similar to or the same as the components of the lift lock valve 114.

When in the lock position, as shown in FIG. 8A, the planar end 154b of the valve seat 122.3 seals the bore 510 of the lift chamber 502, inhibiting the flow of hydraulic fluid through the lift lock valve 114.4 and thereby inhibiting the movement of the lift hydraulic cylinder 54. The lift lock valve 114.4 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. In this example, the pilot control valve 62c.1 enables flow between the pilot chamber 504 and the tank fluid conduit 116.1 to drain the hydraulic fluid from the pilot chamber 504, thereby enabling the force F of the biasing member 128 to maintain the valve seat 122.3 in the lock position. In the lock position, the visual indicator 164 defined on the second rod end 162.4 extends outwardly from the lift chamber 502 and into the second lock indicator window 508 to visually indicate that the lift lock valve 114.4 is in the lock position.

With reference to FIG. 8B, when the hydraulic circuit (i.e. the pilot control valve 62c.1) is commanded to supply hydraulic fluid from the pumps 60 to the lift lock valve 114.4, the hydraulic fluid flows through the pilot fluid conduit 116a and acts on the head 126. The hydraulic pressure Fp from the hydraulic fluid that acts on the head 126 is greater than the force F and overcomes the force F of the biasing member 128 to move the head 126 and the valve seat 122.3, and thus, the lift lock valve 114.4 to the unlock position. In the unlock position, hydraulic fluid is received from the lift control valve 62b and enters via the port 116c. The hydraulic fluid flows through the bore 510 into the lift chamber 502 and from the lift chamber 502 to the bore 116b to drive the lift hydraulic cylinder 54. In the unlock position, the visual indicator 164 defined on the first rod end 160.4 extends outwardly from the pilot chamber 504 and into the first unlock indicator window 506 to visually indicate that the lift lock valve 114.4 is in the unlock position.

Figure 9A:
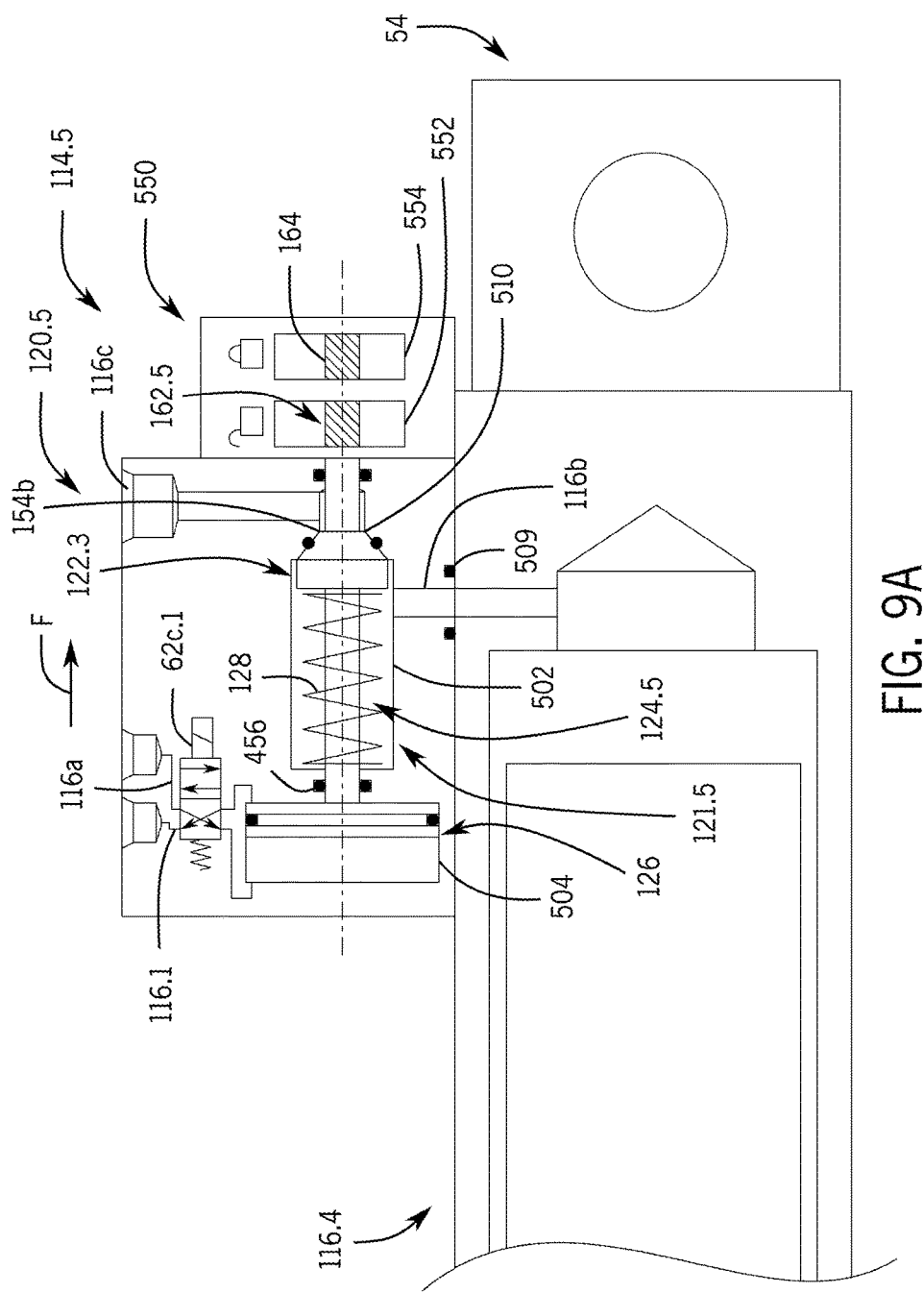
FIG. 9A is a schematic view of another hydraulic actuator lock valve for use with the hydraulic actuator lock valve system of FIG. 1, which illustrates the lock valve in the lock position.
Figure 9B:
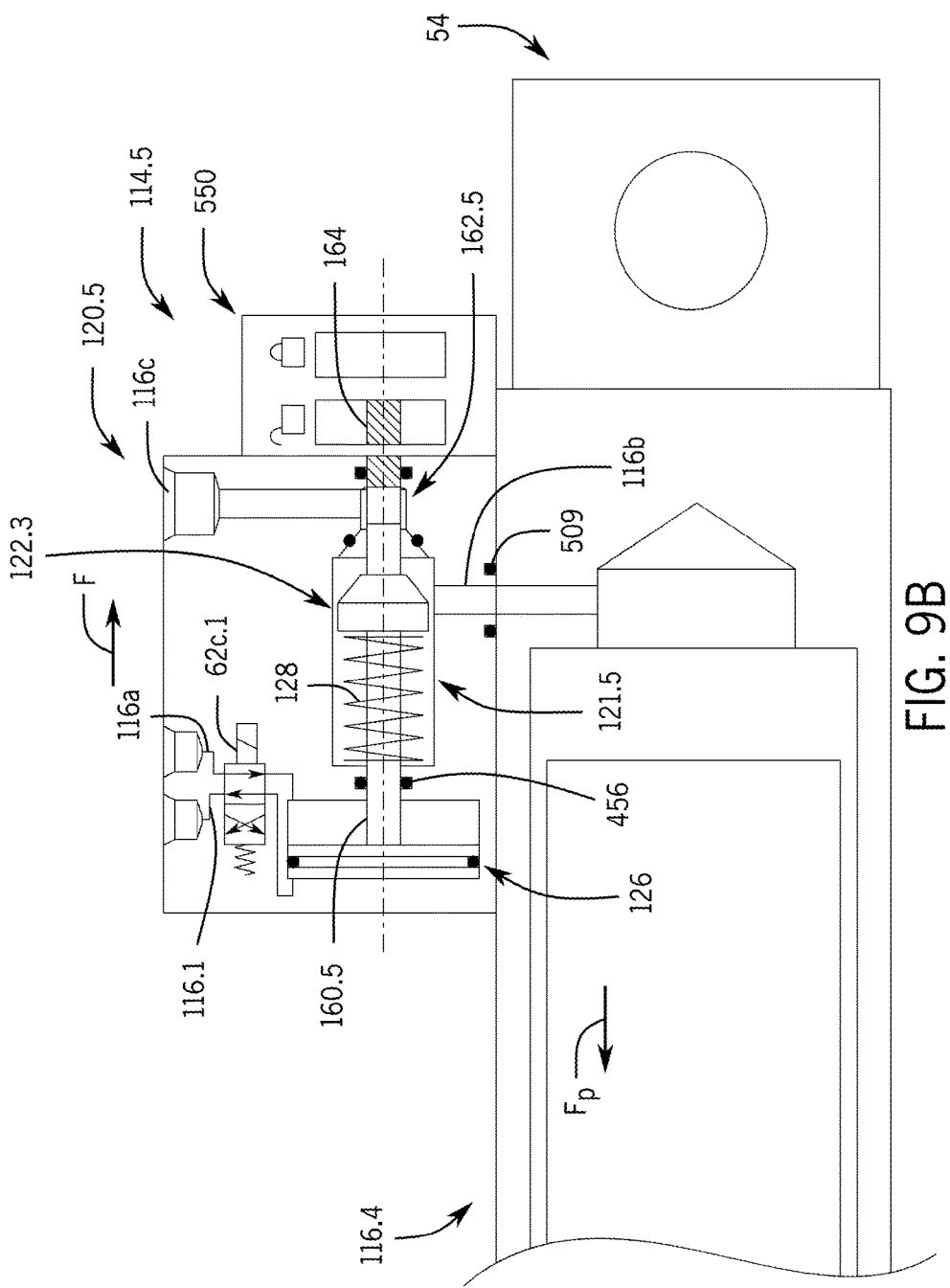
FIG. 9B is a schematic view of the lock valve of FIG. 9A, which illustrates the lock valve in the unlock position.

In one example, with reference to FIGS. 9A-9B, a lift lock valve 114.5 is shown for use with a respective lift hydraulic cylinder 54. The lift lock valve 114.5 may also be used with the lock system 200 of the hydraulic actuator lock valve system 100. As the lift lock valve 114.5 is similar to the lift lock valve 114 described with regard to FIGS. 2A and 2B and the lift lock valve 114.4 described with regard to FIGS. 8A and 8B, the same reference numerals will be used to denote the same features. In addition, one or both of the warning labels 352, 354 may be employed with the lift lock valve 114.5.

The lift lock valve 114.5 is coupled to the lift hydraulic cylinder 54, and in this example, is coupled to an exterior surface of the housing 116.4 of the lift hydraulic cylinder 54. The lift lock valve 114.5 is responsive to hydraulic fluid received from the pilot control valve 62c.1 to move from the lock position (FIG. 9A) to the unlock position (FIG. 9B). In the unlock position, the lift lock valve 114.5 enables the lift hydraulic actuator 54 to be driven by hydraulic fluid supplied by the lift control valve 62b via the pumps 60. In the absence of hydraulic fluid, the lift lock valve 114.5 is in the lock position, in which hydraulic fluid is inhibited from being supplied to the lift hydraulic cylinder 54, thereby inhibiting the movement of the lift hydraulic cylinder 54.

In this example, the lift lock valve 114.5 includes a valve housing 120.5 and a valve body 121.5. The valve body 121.5 includes the valve seat 122.3, a rod 124.5, the head 126 and the biasing member 128. The valve housing 120.5 defines the first conduit 500, the lift chamber 502, the pilot chamber 504, a lock/unlock indicator window 550. The valve housing 120.5 also defines the bore 116b, the pilot fluid conduit 116a, the tank fluid conduit 116.1 and the port 116c. The valve housing 120.5 is generally composed of a metal or metal alloy, and the first conduit 500, the lift chamber 502, the pilot chamber 504, the bore 116b, the port 116c, the pilot fluid conduit 116a and the tank fluid conduit 116.1 may be machined in the valve housing 120.5, or may be formed with the valve housing 120.5 via investment casting, etc. The valve housing 120.5 may also include the sealing members 509 to retain the hydraulic fluid within the valve housing 120.5.

The lock/unlock indicator window 550 may be discrete from the valve housing 120.5, and may be composed of a transparent polymeric material, for example, which is coupled to the valve housing 120.5 via one or more mechanical fasteners. The lock/unlock indicator window 550 includes an unlock window 552 and a lock window 554. The unlock window 552 receives a portion of the rod 124.5 when the lift lock valve 114.5 is in the unlock position to visually indicate the current position of the lift lock valve 114.5. The lock window 554 receives a portion of the rod 124.5 when the lift lock valve 114.5 is in the lock position to visually indicate the current position of the lift lock valve 114.5.

The rod 124.5 is substantially cylindrical. The rod 124.5 has a first rod end 160.5 and a second rod end 162.5. The first rod end 160.5 is coupled to the head 126 and is disposed in the pilot chamber 504. The second rod end 162.5 includes the visual indicator 164, and is disposed in the lift chamber 502. In this example, the valve seat 122.3 is coupled to the rod 124.5 between the first rod end 160.5 and the second rod end 162.5, and is disposed within the lift chamber 502. The biasing member 128 is coupled about the rod 124.5 near the second rod end 162.5 so as to be positioned between the valve seat 122.3 and an endwall of the lift chamber 502.

As the lift lock valve 114.5 may be formed and assembled in a manner similar to that described previously herein, the formation and assembly of the lift lock valve 114.5 will not be discussed in great detail herein. The valve seat 122.3, the rod 124.5, the head 126 and the biasing member 128 of the lift lock valve 114.5 may also be composed of materials similar to or the same as the components of the lift lock valve 114.

When in the lock position, as shown in FIG. 9A, the planar end 154*b* of the valve seat 122.4 seals the bore 510 of the lift chamber 502, inhibiting the flow of hydraulic fluid through the lift lock valve 114.5 and thereby inhibiting the movement of the lift hydraulic cylinder 54. The lift lock valve 114.5 in the lock position locks the lift hydraulic cylinder 54 at a selected position within the range of motion of the header 44 and/or feederhouse 28 relative to the ground 38 (FIG. 1) and inhibits the movement of the lift hydraulic cylinder 54, thereby allowing work to be done in and around the header 44 and/or feederhouse 28. In this example, the pilot control valve 62*c*.1 enables flow between the pilot chamber 504 and the tank fluid conduit 116.1 to drain the hydraulic fluid from the pilot chamber 504, thereby enabling the force F of the biasing member 128 to maintain the valve seat 122.3 in the lock position. In the lock position, the visual indicator 164 defined on the second rod end 162.5 extends outwardly from the lift chamber 502 and into the lock window 554 to visually indicate that the lift lock valve 114.5 is in the lock position.

With reference to FIG. 9B, when the hydraulic circuit (i.e. the pilot control valve 62*c*.1) is commanded to supply hydraulic fluid from the pumps 60 to the lift lock valve 114.5, the hydraulic fluid flows through the pilot fluid conduit 116*a* and acts on the head 126. The hydraulic pressure Fp from the hydraulic fluid is greater than the force F and overcomes the force F of the biasing member 128 to move the head 126 and the valve seat 122.3, and thus, the lift lock valve 114.5 to the unlock position. In the unlock position, hydraulic fluid is received from the lift control valve 62*b* and enters via the port 116*c*. The hydraulic fluid flows through the bore 510 into the lift chamber 502 and from the lift chamber 502 to the bore 116*b* to drive the lift hydraulic cylinder 54. In the unlock position, the visual indicator 164 defined on the second rod end 162.5 extends outwardly from the lift chamber 502 and into the unlock window 552 to visually indicate that the lift lock valve 114.5 is in the unlock position.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lock valve for a hydraulic actuator comprising:
   a valve housing coupled to the hydraulic actuator, the valve housing defining a chamber in selective fluid communication with a hydraulic circuit, the valve housing having a first window and a second window; and
   a valve body received within the chamber and responsive to the hydraulic circuit to move between an unlock position in which the lock valve is unlocked and a lock position in which the lock valve is locked, the valve body including:
      a rod having at least one visual indicator, the rod contained within the valve housing, in part by the first window and the second window, when the lock valve is in each of the unlock position and the lock position; and
      a head coupled to the rod and responsive to the hydraulic circuit to move the valve body;
   wherein the visual indicator is viewable through the first window when the lock valve is in the unlock position and the visual indicator is viewable through the second window when the lock valve is in the lock position.

2. The lock valve of claim 1, wherein, in the lock position of the lock valve, the visual indicator is not viewable through the first window.

3. The lock valve of claim 1, wherein in the lock position of the lock valve, the visual indicator is viewable through the first window and the second window.

4. The lock valve of claim 1, wherein the visual indicator is located at one end of the rod; and
   wherein the first window and the second window are located on the valve housing proximate the end of the rod having the visual indicator.

5. The lock valve of claim 1, wherein the visual indicator includes first and second visual indicators located at opposite ends of the rod; and
   wherein the first window is located on the valve housing proximate the first visual indicator and the second window is located on the valve housing proximate the second visual indicator.

6. The lock valve of claim 1, wherein the valve body further comprises a biasing member and a valve seat coupled to the rod, the biasing member biases the valve seat toward the lock position of the lock valve.

7. The lock valve of claim 1, wherein in the unlock position, the hydraulic actuator is in fluid communication with a second hydraulic circuit to enable movement of the hydraulic actuator.

8. The lock valve of claim 1, further including a lock pin;
   wherein the valve housing further defines a first bore and the rod defines a second bore; and
   wherein the lock pin is received within the first bore and the second bore to retain the valve body in the lock position.

9. An agricultural work vehicle having an engine, an operator seat and a header that is movable by actuation of a hydraulic actuator over a range of motion relative to a ground surface, the agricultural work vehicle comprising:
   a lock valve coupled to the hydraulic actuator, the lock valve including:
      a valve housing coupled to the hydraulic actuator that defines a chamber in selective fluid communication with a hydraulic circuit;
      a valve body received within the chamber and responsive to the hydraulic circuit to move between an unlock position in which the lock valve is unlocked and a lock position in which the lock valve is locked, the valve body including:
         a rod; and
         a head coupled to the rod and responsive to the hydraulic circuit to
      move the valve body; and
   a controller that commands the hydraulic circuit to supply hydraulic fluid to the chamber to move the valve body based on inputs from an engine switch and an occupant presence switch;
   wherein the controller commands the hydraulic circuit to move the valve body to the unlock position when the input from the engine switch indicates that the engine is operating and when the input from the occupant presence switch indicates that the operator seat is occupied; and
   wherein in the lock position, the lock valve is configured to lock the hydraulic actuator in a plurality of positions over the range of motion.

10. The agricultural work vehicle of claim 9, wherein the controller commands the hydraulic circuit to move the valve body based on an input signal from a remote control switch coupled to the agricultural work vehicle.

11. The agricultural work vehicle of claim 9, wherein the valve housing is coupled to the hydraulic actuator.

12. The agricultural work vehicle of claim 9, wherein in the unlock position, the hydraulic actuator is in fluid communication with a second hydraulic circuit to enable movement of the hydraulic actuator.

13. The agricultural work vehicle of claim 9, wherein the valve body further comprises a biasing member coupled to the head that moves the valve body to the lock position of the lock valve.

14. The agricultural work vehicle of claim 9, wherein the valve housing having a first window and a second window and the rod has at least one visual indicator; and
   wherein the visual indicator is viewable through the first window when the lock valve is in the unlock position and the visual indicator is viewable through the second window when the lock valve is in the lock position.

15. The agricultural work vehicle of claim 14, wherein, in the lock position of the lock valve, the visual indicator is not viewable through the first window.

16. The agricultural work vehicle of claim 14, wherein, in the lock position of the lock valve, the visual indicator is viewable through the first window and the second window.

17. The agricultural work vehicle of claim 14, wherein the visual indicator is located at one end of the rod; and
   wherein the first window and the second window are located on the valve housing proximate the end of the rod having the visual indicator.

18. The agricultural work vehicle of claim 14, wherein the visual indicator includes first and second visual indicators located at opposite ends of the rod; and
   wherein the first window is located on the valve housing proximate the first visual indicator and the second visual indicator is located on the valve housing proximate the second visual indicator.

\* \* \* \* \*